(12) United States Patent
Kubo et al.

(10) Patent No.: US 9,602,175 B2
(45) Date of Patent: Mar. 21, 2017

(54) RADIO BASE STATION, MASTER STATION APPARATUS, SLAVE STATION APPARATUS, AND CONTROL METHOD

(71) Applicant: NTT DOCOMO, INC., Tokyo (JP)

(72) Inventors: Takahiro Kubo, Tokyo (JP); Takahiro Asai, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/112,210

(22) PCT Filed: Dec. 3, 2015

(86) PCT No.: PCT/JP2015/083963
§ 371 (c)(1),
(2) Date: Jul. 18, 2016

(87) PCT Pub. No.: WO2016/088820
PCT Pub. Date: Jun. 9, 2016

(65) Prior Publication Data
US 2016/0337009 A1 Nov. 17, 2016

(30) Foreign Application Priority Data

Dec. 5, 2014 (JP) .................................. 2014-246497

(51) Int. Cl.
*H04B 7/024* (2017.01)
*H04J 11/00* (2006.01)
(Continued)

(52) U.S. Cl.
CPC ......... *H04B 7/024* (2013.01); *H04B 10/2575* (2013.01); *H04J 11/00* (2013.01);
(Continued)

(58) Field of Classification Search
CPC ........................... H04B 7/024; H04W 72/0433
See application file for complete search history.

(56) References Cited

U.S. PATENT DOCUMENTS 8,737,298 B2 * 5/2014 Hui ........................ H04B 7/024
370/328

FOREIGN PATENT DOCUMENTS

JP 2006332937 * 12/2006 ........... H04B 10/077
JP 2013183253 A 9/2013

OTHER PUBLICATIONS

International Search Report issued in corresponding application No. PCT/JP2015/083963 mailed Feb. 9, 2016 (4 pages).
(Continued)

*Primary Examiner* — Tuan H Nguyen
(74) *Attorney, Agent, or Firm* — Osha Liang LLP

(57) ABSTRACT

A master station apparatus modulates downlink digital control data that includes at least a synchronization signal and a control signal, adds resource element information to the modulated control data, and composites downlink digital frequency-domain user data that has not been modulated and data originating from the modulated control data to which the resource element information has been added. A slave station apparatus converts a received optical signal into an electrical signal, separates, from the electrical signal, the frequency-domain user data and the data originating from the modulated control data, modulates the frequency-domain user data, adds resource element information to the modulated user data, and transmits time-domain composite data including a component originating from the modulated user data and a component originating from the modulated control data by radio waves.

10 Claims, 13 Drawing Sheets

(51) Int. Cl.
 H04W 88/08 (2009.01)
 H04B 10/2575 (2013.01)
 H04W 72/04 (2009.01)
(52) U.S. Cl.
 CPC ....... *H04W 72/0433* (2013.01); *H04W 88/08* (2013.01); *H04W 88/085* (2013.01)

(56) References Cited

OTHER PUBLICATIONS

Written Opinion of the International Searching Authority issued in corresponding application No. PCT/JP2015/083963 mailed Feb. 9, 2016 (4 pages).

Lorca et al., "Lossless Compression Technique for the Fronthaul of LTE/LTE-Advanced Cloud-RAN Architectures"; 2013 IEEE 14th International Symposium and Workshops on a World of Wireless, Mobile and Multimedia Networks (WoWMoM); Madrid, Spain; Jun. 4-7, 2013 (9 pages).

* cited by examiner

RADIO BASE STATION, MASTER STATION APPARATUS, SLAVE STATION APPARATUS, AND CONTROL METHOD

TECHNICAL FIELD

The present invention relates to a radio base station in a radio communication system, to a master station apparatus and a slave station apparatus included in the radio base station, and to control methods in the radio base station, in the master station apparatus, and in the slave station apparatus.

BACKGROUND ART

In a radio communication system such as a mobile phone system, exchange of signals between user equipment such as a mobile phone terminal and a radio base station is performed by radio communication that uses radio waves. In the radio communication system, a remote antenna unit (slave station apparatus, RAU) can be used, in order to extend the area over which radio communication with the user equipment is possible. Specifically, one or more slave station apparatuses are connected to a baseband unit (master station apparatus, BBU) of the radio base station, and the slave station apparatuses perform radio communication with the user equipment. The coverage area is extended by disposing such slave station apparatuses in areas where the radio waves of the radio base station do not reach. Typically, slave station apparatuses are disposed in places such as high-rise buildings, underground malls, and train stations. Slave station apparatuses (RAU) are also called optical feeder radio apparatuses or remote radio heads (RRH).

In the radio base station, each slave station apparatus and the master station apparatus are typically connected by optical fiber having low signal propagation loss. For example, Patent Document 1 discloses a radio communication system in which each slave station apparatus is connected to the master station apparatus by optical fiber. Technologies using optical fiber in this way for some of the communication channels in a radio communication system are known as ROF (Radio over Fiber) technologies.

A radio frequency signal (RF signal) from the user equipment is received by an antenna of a slave station apparatus, and then optically transmitted to the master station apparatus via an interface such an interface compliant with CPRI (Common Public Radio Interface).

In LTE (Long Term Evolution) developed by the 3GPP (Third Generation Partnership Project), OFDMA (Orthogonal Frequency Division Multiple Access) is used as the radio access system for the downlink in a radio section from the radio base station to the user equipment, and SC-FDMA (Single Carrier Frequency Division Multiple Access) is used as the radio access system for the uplink in a radio section from the user equipment to the radio base station.

RELATED ART DOCUMENT

Patent Document

Patent Document 1: Japanese Patent Application Laid-Open Publication No. 2013-183253

SUMMARY OF THE INVENTION

Problem to be Solved by the Invention

In downlink transmission, the master station apparatus performs constellation mapping for carrying out modulation processing such as QPSK (Quadrature Phase Shift Keying) or 16QAM (Quadrature Amplitude Modulation) on a downlink digital signal. The master station apparatus then inverse-Fourier transforms the modulated digital signal, converts the inverse-Fourier transformed signal into an optical signal, and transmits the optical signal to the slave station apparatus. The slave station apparatus converts the optical signal into an electrical signal and transmits a downlink signal by radio waves using a transmitting antenna. The digital signal modulated by the master station apparatus represents a constellation, and is thus longer than the unmodulated digital signal. Particularly when the modulation level is high, the modulated digital signal will be considerably longer than the unmodulated digital signal. Accordingly, the amount of data that is transmitted over the optical communication channel increases.

For example, when a transmission rate of 150 Mbps with radio transmission by downlink radio waves is to be achieved using 2×2 MIMO with a 20 MHz bandwidth, a transmission rate of 2.5 Gbps over the optical communication channel is required because the amount of data that is transmitted over the optical communication channel increases. Assuming that the ratio of the radio transmission rate and the optical transmission rate is maintained, in order to achieve a transmission rate of 1 Gbps with radio transmission by downlink radio waves, a transmission rate of 16 Gbps or more is required over the optical communication channel. It is difficult to accomplish the above transmission rate with the current CPRI specification because the maximum transmission rate of an optical communication channel is 10 Gbps.

The amount of downlink user data to be transmitted to the user equipment changes over time. The amount of data that is transmitted over the optical communication channel, however, is constant since zero is input to the inverse Fourier transformation unit of the master station apparatus if there is not much user data. In other words, if there is not much user data, the amount of optical data originating from the user data increases considerably.

In uplink transmission, the slave station apparatus converts a signal received by the receiving antenna from the user equipment into a digital signal, converts the digital signal into an optical signal, and transmits the optical signal to the master station apparatus. The master station apparatus converts the optical signal into an electrical signal, and further performs various types of processing on the electrical signal to separate user data and control data. The digital signal that is obtained through digital conversion in the slave station apparatus represents a constellation resulting from modulation performed in the user equipment, and thus is long. Particularly when the modulation level used in the user equipment is high, the digital signal obtained through digital conversion in the slave station apparatus is extremely long. Accordingly, the amount of data that is transmitted over the optical communication channel increases.

It is therefore desirable to reduce the amount of data in optical signals over an optical fronthaul between the master station apparatus and the slave station apparatus. Merely omitting signals, however, will hinder communication between the user equipment and the radio base station.

In view of the above situation, the present invention provides a technology that is able to reduce the amount of data that is transmitted over an optical communication channel between a master station apparatus and a slave station apparatus, without hindering communication between user equipment and a radio base station.

Means of Solving the Problems

A radio base station according to a downlink transmission mode of the present invention includes: a master station apparatus; a slave station apparatus that performs radio communication with user equipment; and an optical communication channel that connects the slave station apparatus and the master station apparatus. The master station apparatus includes: a modulated control data generation unit that modulates downlink digital control data that includes at least a synchronization signal and a control signal to generate modulated control data; a resource element mapping unit that adds, to the modulated control data, resource element information indicating a resource element for radio-transmitting the control data in the slave station apparatus; a combining unit that combines downlink digital frequency-domain user data that has not been modulated and data originating from the modulated control data to which the resource element information has been added; and an output conversion unit that converts output data of the combining unit into an optical signal transmittable over the optical communication channel. The slave station apparatus includes: an optical-electrical conversion unit that converts the optical signal received via the optical communication channel into an electrical signal; a separation unit that separates, from the electrical signal, the frequency-domain user data and the data originating from the modulated control data; a modulated user data generation unit that modulates the frequency-domain user data to generate modulated user data; a resource element mapping unit that adds, to the modulated user data, resource element information indicating a resource element for radio-transmitting the user data; and a radio transmission unit that transmits, by radio waves, time-domain composite data including a component originating from the modulated user data to which the resource element information has been added and a component originating from the modulated control data to which the resource element information has been added.

A radio base station according to an uplink transmission mode of the present invention includes: a slave station apparatus that performs radio communication with user equipment; a master station apparatus; and an optical communication channel that connects the slave station apparatus and the master station apparatus. The slave station apparatus includes: a Fourier transformation unit that Fourier transforms uplink digital time-domain data originating from a signal received from the user equipment to generate frequency-domain data; a first inverse Fourier transformation unit that inverse-Fourier transforms frequency-domain user data corresponding to user data, out of the frequency-domain data, to generate time-domain user data; a user data demodulation unit that demodulates the time-domain user data to restore the user data; a combining unit that combines the user data and frequency-domain control data corresponding to control data, out of the frequency-domain data, that includes at least a control signal; and an output conversion unit that converts output data of the combining unit into an optical signal transmittable over the optical communication channel. The master station apparatus includes: an optical-electrical conversion unit that converts the optical signal received via the optical communication channel into an electrical signal; a separation unit that separates the electrical signal into the user data and the frequency-domain control data; a second inverse Fourier transformation unit that inverse-Fourier transforms the frequency-domain control data to generate time-domain control data; and a control data demodulation unit that demodulates the time-domain control data to restore the control data.

The present invention relating to the above radio base stations can also be understood as an invention of a control method regarding operations (steps) that are executed by elements included in the radio base stations.

Effect of the Invention

The master station apparatus according to the downlink transmission mode of the present invention combines digital frequency-domain user data that has not been modulated and to which resource element information has not been added and data that originates from modulated control data that has been modulated and to which resource element information has been added. The master station apparatus then converts the combined data into an optical signal. Since the master station apparatus does not modulate digital user data, the amount of optical data originating from the user data does not increase. Furthermore, since the master station apparatus converts, into the optical signal, the user data as user data of the frequency domain (frequency-domain user data) without inverse-Fourier transforming the user data, the amount of optical data originating from the user data does not increase in this point either. The amount of data that is transmitted over the optical communication channel between the master station apparatus and the slave station apparatus can thus be considerably reduced, compared with a case in which the master station apparatus modulates and inverse-Fourier transforms the user data.

With regard to control data, the processing involved in resource element mapping is complex compared with that for user data. The processing in the slave station apparatus thus increases if the slave station apparatus, which generally has limited processing capacity, performs modulation and resource element mapping of control data. Also, generation of control data is a complex process. Generating the control data in the slave station apparatus greatly increases the processing load on the slave station apparatus. In view of this, the processing load on the slave station apparatus is reduced by the master station apparatus performing the modulation and resource element mapping of control data. User data is subject to modulation processing, resource element mapping, and inverse Fourier transformation in the slave station apparatus that executes OFDMA-based radio transmission. The load of these types of processing of user data is small. Accordingly, in the radio base station according to the downlink transmission mode of the present invention, the amount of data that is transmitted over optical communication channels can be considerably reduced, while the increase in the processing load on the slave station apparatus is minimized.

In the radio base station according to the uplink transmission mode of the present invention, the slave station apparatus inverse-Fourier transforms frequency-domain user data to generate time-domain user data, and demodulates the time-domain user data to restore digital user data. The user data demodulated in this way does not represent a constellation, and thus is short. Accordingly, the amount of data that is transmitted over the optical communication channel between the master station apparatus and the slave station apparatus can be reduced, compared with a case in which the slave station apparatus does not demodulate the user data. With regard to control data, the processing load on the slave station apparatus increases if the slave station apparatus performs inverse Fourier transformation and demodulation. In view of this, the processing load on the slave station apparatus, which generally has limited processing capacity, is reduced by the master station apparatus performing inverse Fourier transformation and demodulation of control data.

MODES FOR CARRYING OUT THE INVENTION

Figure 1:
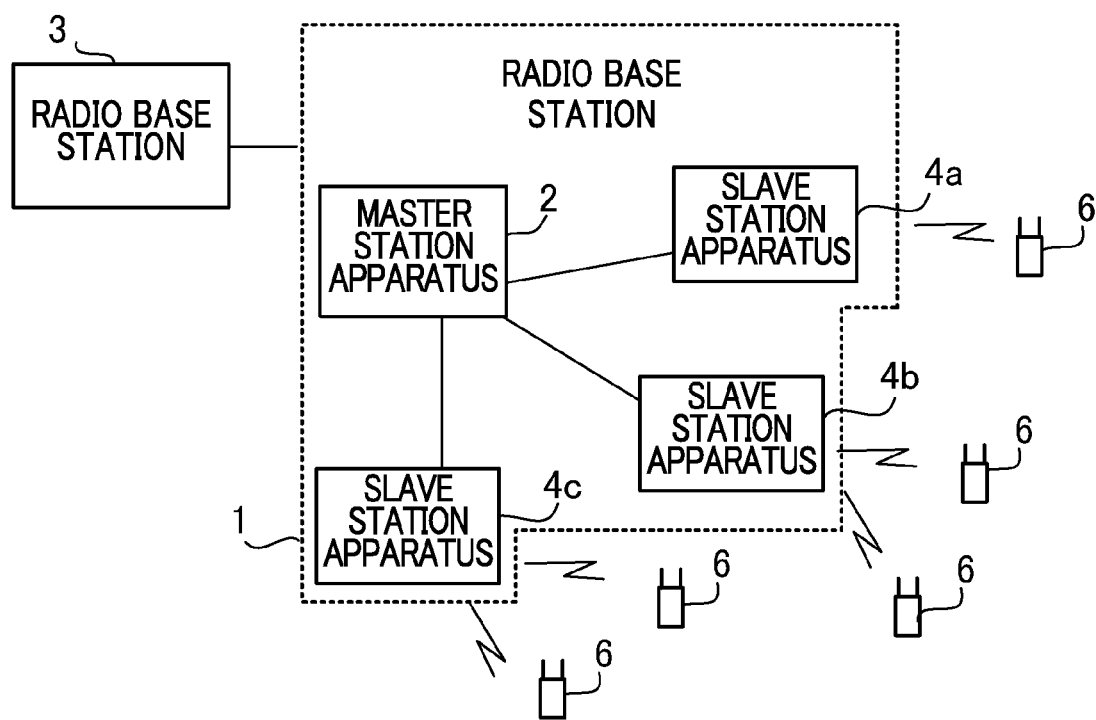
FIG. 1 is a schematic view showing a radio communication system according to various embodiments of the present invention.

Hereinafter, various embodiments according to the present invention will be described with reference to the attached drawings. As shown in FIG. 1, a radio communication system according to the various embodiments of the present invention is a mobile phone system and includes a plurality of radio base stations 1 and 3. The radio base stations 1 and 3 are capable of communicating with each other by cable or by radio. The radio communication system according to the present invention is a system based on a radio access technology that is compliant with LTE. Each of the radio base stations 1 and 3 is capable of communicating with user equipment 6, which is a mobile terminal, and processes signals transmitted from the user equipment 6 and signals directed to the user equipment 6.

The radio base station 1 includes a master station apparatus 2 (baseband unit (BBU)) and a plurality of slave station apparatuses 4 (remote antenna units (RAU) or remote radio heads (RRH)). The master station apparatus 2 may have the form of, for example, a board or a blade that is removable from the radio base station 1. The plurality of slave station apparatuses 4 (4a, 4b, 4c, . . . ) are connected to the master station apparatus 2.

The master station apparatus 2 and each slave station apparatus 4 are connected by optical fiber. The slave station apparatuses 4 are disposed remotely from the master station apparatus 2. The master station apparatus 2 has a function to communicate with the slave station apparatuses 4. Each slave station apparatus 4 is capable of communicating with the master station apparatus 2 via corresponding optical fiber. The slave station apparatuses 4 have a radio communication function and are thereby also capable of communicating with the user equipment 6.

In downlink communication, the master station apparatus 2 transmits a signal directed to the user equipment 6 via optical fiber to all of the slave station apparatuses 4 connected to the master station apparatus 2. Utilizing OFDMA, the slave station apparatuses 4 transmit the signal to the user equipment 6 by radio. The user equipment 6 demodulates and decodes the signal received by radio from any of the slave station apparatuses 4.

In uplink communication, a radio signal transmitted from the user equipment 6 using SC-FDMA is received by the slave station apparatuses 4 capable of reception. The signal received by the slave station apparatuses 4 is transmitted to the master station apparatus 2 via optical fiber. When an uplink radio signal from one piece of user equipment 6 is received by a plurality of slave station apparatuses 4, the radio base station 1 selects a signal of good quality.

Since the slave station apparatuses 4 are disposed remotely from the master station apparatus 2, the coverage area of the radio base station 1 is extended. The plurality of slave station apparatuses 4 may be disposed in one building (e.g., high-rise building, underground mall, or train station), or may be disposed in different buildings.

As is clear from the above description, the master station apparatus 2 and the slave station apparatuses 4, regardless of the distance therebetween, can be regarded as being included in one radio base station 1. The radio base station 1 can also be regarded as an appendage of the radio base station 3, which is itself capable of communicating with the user equipment 6. In this case, the radio base stations 1 and 3 can be regarded as being included in one radio base station.

First Embodiment

Figure 2:
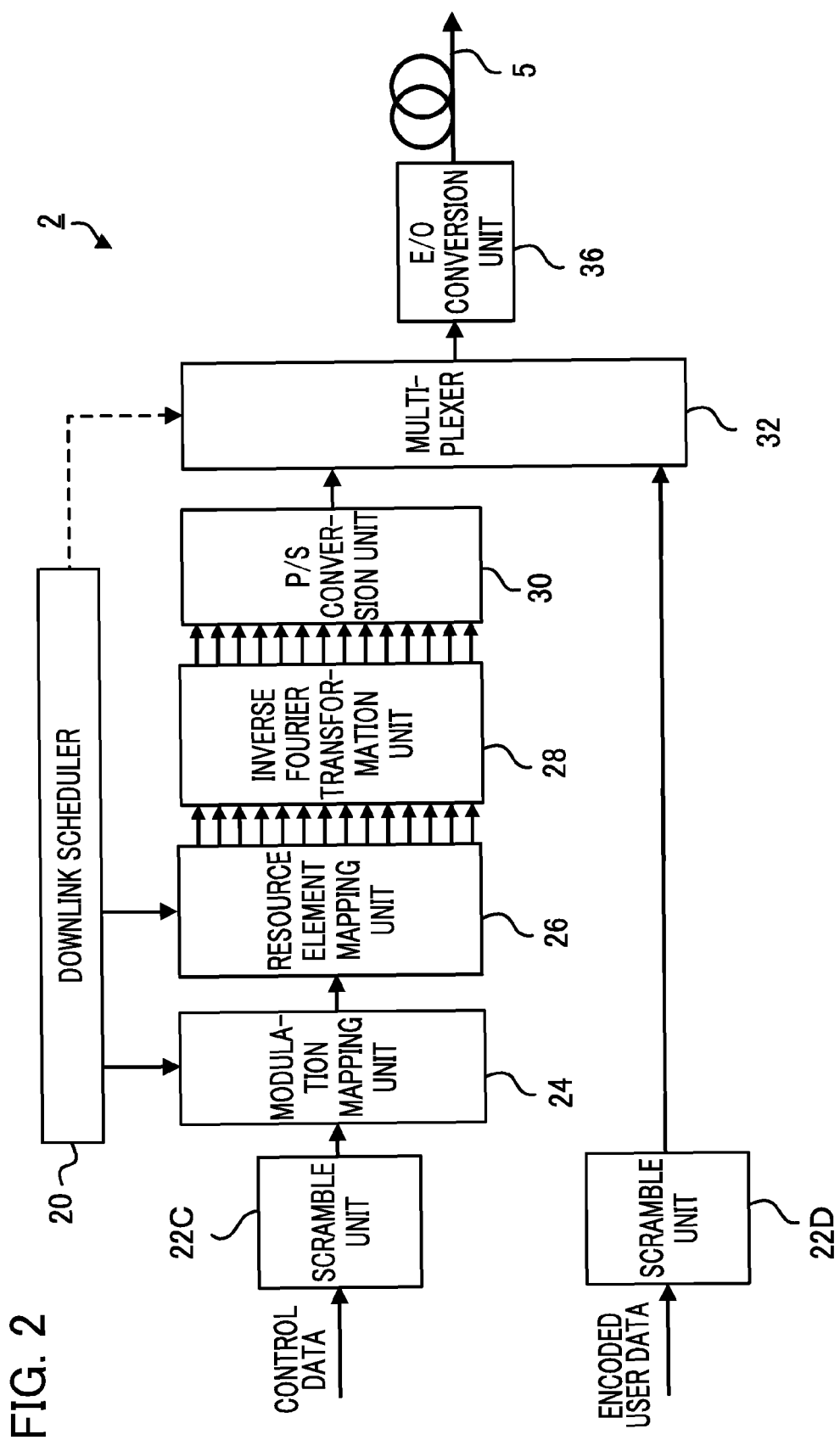
FIG. 2 is a block diagram showing the configuration of a master station apparatus according to a first embodiment of the present invention.

FIG. 2 is a block diagram showing the configuration of a master station apparatus 2 according to a first embodiment. In FIG. 2, parts relevant to downlink communication are shown, and illustration of other parts is omitted.

As shown in FIG. 2, the master station apparatus 2 is connected to optical fiber (optical communication channel) 5. The master station apparatus 2 is able to transmit optical signals to the slave station apparatuses 4 over the optical fiber 5 in compliance with, for example, CPRI.

The master station apparatus 2 includes a downlink scheduler 20, scramble units 22C and 22D, a modulation mapping unit 24, a resource element mapping unit 26, an inverse Fourier transformation unit 28, a P/S (parallel-serial) conversion unit 30, a multiplexer 32, and an E/O (electrical-optical) conversion unit 36.

The downlink scheduler 20, the scramble units 22C and 22D, the modulation mapping unit 24, and the resource element mapping unit 26 are functional blocks that are accomplished by a CPU (central processing unit; not shown in the figure) of the master station apparatus 2 executing a computer program and functioning in accordance with the computer program.

The scramble unit 22C scrambles, out of downlink digital control data, control data that requires scrambling. The scramble unit 22D scrambles encoded downlink digital user data. In this specification, downlink user data refers to user data signals that are transmitted over a PDSCH (Physical Downlink Shared Channel) and a PMCH (Physical Multicast Channel).

In this specification, downlink control data refers to any physical layer downlink signals other than the above-mentioned downlink user data signals. Specifically, the downlink control data refers to signals that are transmitted over a PHICH (Physical HARQ Indicator Channel), a PDCCH (Physical Downlink Control Channel), a PCFICH (Physical Control Format Indicator Channel), and a PBCH (Physical Broadcast Channel), and to an SS (Synchronization Signal) and an RS (Reference Signal). Accordingly, the downlink control data includes at least a synchronization signal and a control signal (a PDCCH signal).

The modulation mapping unit (modulated control data generation unit) 24 performs modulation processing that applies a modulation format to control data to generate modulated control data. The modulated control data is digital data representing a constellation. The downlink scheduler 20 designates a modulation format (e.g., BPSK, QPSK) to be used in modulation, according to the type of control data or the like. In accordance with the designation, the modulation mapping unit 24 modulates the control data.

The resource element mapping unit 26 adds, to the modulated control data, resource element information that indicates resource elements in OFDMA for the slave station apparatuses 4 to perform radio transmission of the control data. The downlink scheduler 20 designates a resource element to be allocated to the control data according to the type of control data or the like. In accordance with the designation, the resource element mapping unit 26 adds the resource element information to the modulated control data.

The inverse Fourier transformation unit (time-domain control data generation unit) 28 inverse-Fourier transforms the modulated control data, to which the resource element information has been added, to generate time-domain control data. The inverse Fourier transformation unit 28 may be a functional block that is accomplished by the CPU (not shown in the figure) of the master station apparatus 2 executing a computer program and functioning in accordance with the computer program, or may be an IC chip. The inverse Fourier transformation unit 28 may perform inverse discrete Fourier transformation or may perform inverse fast Fourier transformation.

The P/S conversion unit 30 converts the time-domain control data, which is output from the inverse Fourier transformation unit 28 and is parallel, into serial sequence in order to optically transmit the time-domain control data to the slave station apparatuses 4.

The digital multiplexer (combining unit) 32 combines the digital time-domain control data, which is output from the P/S conversion unit 30, and the digital frequency-domain user data, which is output from the scramble unit 22D. The digital time-domain control data has been modulated, has had the resource element information added thereto, and has been inverse-Fourier transformed. The digital frequency-domain user data has not been modulated, has not had resource element information added thereto, and has not been inverse-Fourier transformed.

The downlink scheduler 20 also supplies the multiplexer 32 with an auxiliary signal (side information (shown in the figure with dotted line)) for assisting the slave station apparatuses 4 to appropriately perform radio transmission of the user data and the control data that are separately processed in the master station apparatus 2. The multiplexer 32 combines the auxiliary signal with the user data and the time-domain control data. The auxiliary signal will be described later.

The E/O (electrical-optical) conversion unit (output conversion unit) 36 converts the data combined by the multiplexer 32 into an optical signal, and sends the optical signal to the optical fiber 5. The E/O conversion unit 36 therefore functions as an output conversion unit that converts the output data of the multiplexer 32 into an optical signal that can be transmitted over the optical fiber 5.

Figure 3:
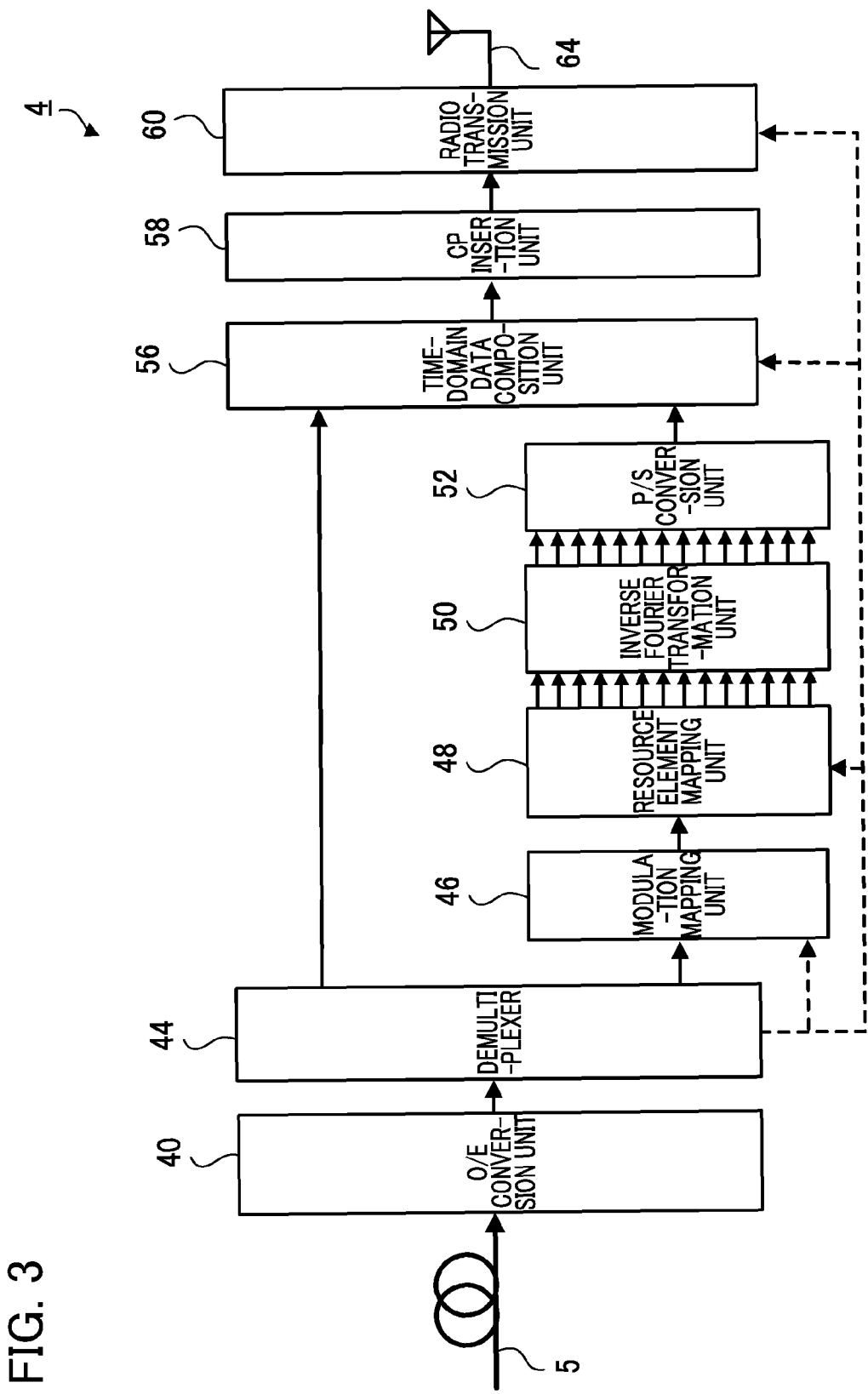
FIG. 3 is a block diagram showing the configuration of a slave station apparatus according to the first embodiment of the present invention.

FIG. 3 is a block diagram showing the configuration of a slave station apparatus 4 according to the first embodiment. In FIG. 3, parts relevant to downlink communication are shown, and illustration of other parts is omitted. For brevity, FIG. 3 shows a single slave station apparatus 4 alone.

As shown in FIG. 3, the slave station apparatus 4 is connected to the optical fiber 5. The slave station apparatus 4 is able to receive optical signals from the master station apparatus 2 over the optical fiber 5 in compliance with CPRI.

The slave station apparatus 4 includes an O/E (optical-electrical) conversion unit 40, a demultiplexer 44, a modulation mapping unit 46, a resource element mapping unit 48, an inverse Fourier transformation unit 50, a P/S conversion unit 52, a time-domain data composition unit 56, a cyclic prefix (CP) insertion unit 58, a radio transmission unit 60, and a transmitting antenna 64.

The modulation mapping unit 46 and the resource element mapping unit 48 are functional blocks that are accomplished by a CPU (not shown in the figure) of the slave station apparatus 4 executing a computer program and functioning in accordance with the computer program.

The O/E conversion unit 40 converts an optical signal received from the master station apparatus 2 via the optical fiber 5 into an electrical signal.

The digital demultiplexer (separation unit) 44 separates the electrical signal, which is converted from the optical signal, into the digital time-domain control data, the digital frequency-domain user data, and the auxiliary signal (shown with dotted lines in the figure). The digital time-domain control data has been modulated, has had the resource element information added thereto, and has been inverse-Fourier transformed in the master station apparatus 2. The digital frequency-domain user data has not been modulated, has not had resource element information added thereto, and has not been inverse-Fourier transformed. Rules used by the demultiplexer 44 for separating the time-domain control data, the user data, and the auxiliary signal correspond to rules used by the multiplexer 32 of the master station apparatus 2 for combining them.

The digital time-domain control data, which has been modulated, has had the resource element information added thereto, and has been inverse-Fourier transformed, is supplied to the time-domain data composition unit 56. The digital frequency-domain user data, which has not been modulated, has not had resource element information added thereto, and has not been inverse-Fourier transformed, is supplied to the modulation mapping unit 46.

The modulation mapping unit (modulated user data generation unit) 46 performs modulation processing that applies a modulation format to the user data to generate modulated user data. The modulated user data is digital data representing a constellation. The downlink scheduler 20 of the master station apparatus 2 determines a modulation format (e.g., QPSK, 16QAM) for each piece of user equipment 6 based on a channel quality indicator (CQI) that is fed back from the user equipment 6. The modulation mapping unit 46 modulates the user data in accordance with the modulation format that the downlink scheduler 20 of the master station apparatus 2 designates for each piece of user equipment 6 to which a PDSCH signal is directed.

The auxiliary signal, which is supplied from the master station apparatus 2, indicates information representing, for each piece of user equipment 6 to which the PDSCH signal is directed, the modulation format to be used to modulate user data. By the master station apparatus 2 thus notifying the slave station apparatus 4 of the information representing the modulation format to be used to modulate user data for each piece of user equipment 6 to which the PDSCH signal is directed, the slave station apparatus 4 is able to modulate the user data, which is transmitted, without having been modulated, from the master station apparatus 2.

The resource element mapping unit 48 adds, to the modulated user data of the frequency domain (frequency-domain modulated user data), resource element information that indicates a resource element in OFDMA for radio transmission of the user data. The downlink scheduler 20 of the master station apparatus 2, based on the information fed back from each piece of user equipment 6 and in accordance with a well-known technique (e.g., proportional fairness algorithm), allocates user data that is directed to each piece of user equipment 6 to a resource block and further allocates the user data to a resource element. The resource element mapping unit 48 adds the resource element information to the modulated user data, in conformity with the resource element allocation that the downlink scheduler 20 of the master station apparatus 2 designates for each piece of user equipment 6 to which the PDSCH signal is directed.

The auxiliary signal, which is supplied from the master station apparatus 2, indicates information representing a resource element to which the user data is to be allocated for each piece of user equipment 6 to which the PDSCH signal is directed. By the master station apparatus 2 thus notifying the slave station apparatus 4 of the information representing the resource element to which the user data is to be allocated for each piece of user equipment 6 to which the PDSCH signal is directed, the slave station apparatus 4 is able to add the resource element information to the user data, which is transmitted, without having had the resource element information added thereto, from the master station apparatus 2.

The inverse Fourier transformation unit (time-domain user data generation unit) 50 inverse-Fourier transforms the frequency-domain modulated user data, to which the resource element information has been added, to generate time-domain user data. The inverse Fourier transformation unit 50 may be a functional block that is accomplished by the CPU (not shown in the figure) of the slave station apparatus 4 executing a computer program and functioning in accordance with the computer program, or may be an IC chip. The inverse Fourier transformation unit 50 may perform inverse discrete Fourier transformation, or may perform inverse fast Fourier transformation.

The P/S conversion unit 52 converts the time-domain user data, which is output from the inverse Fourier transformation unit 50 and is parallel, into serial sequence. The digital time-domain user data, which is output from the P/S conversion unit 52 and has undergone modulation processing and inverse Fourier transformation in the slave station apparatus 4, is supplied to the time-domain data composition unit 56.

Figure 4:
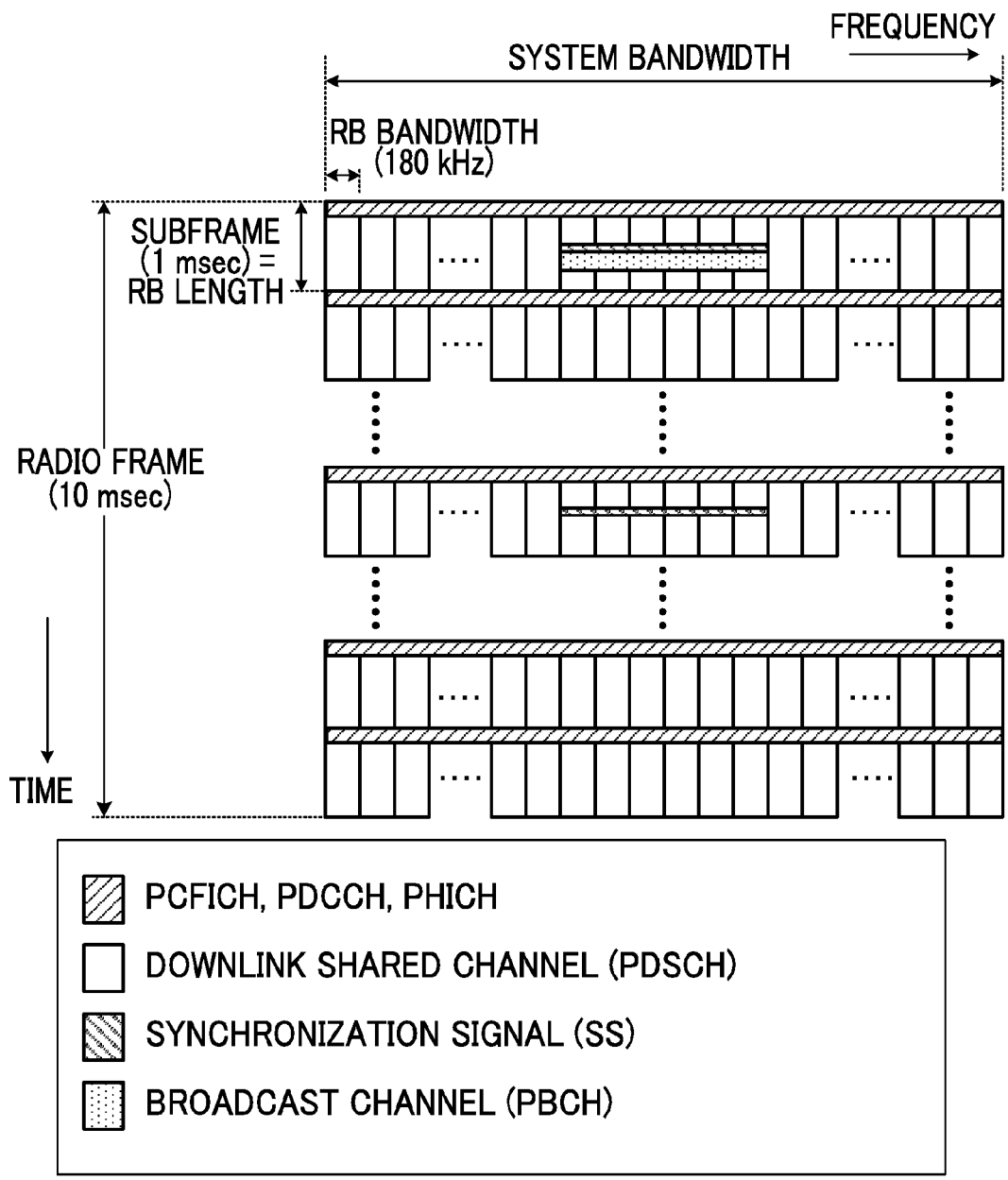
FIG. 4 is a diagram showing an LTE-specified format of a downlink physical channel in a radio section.
Figure 5:
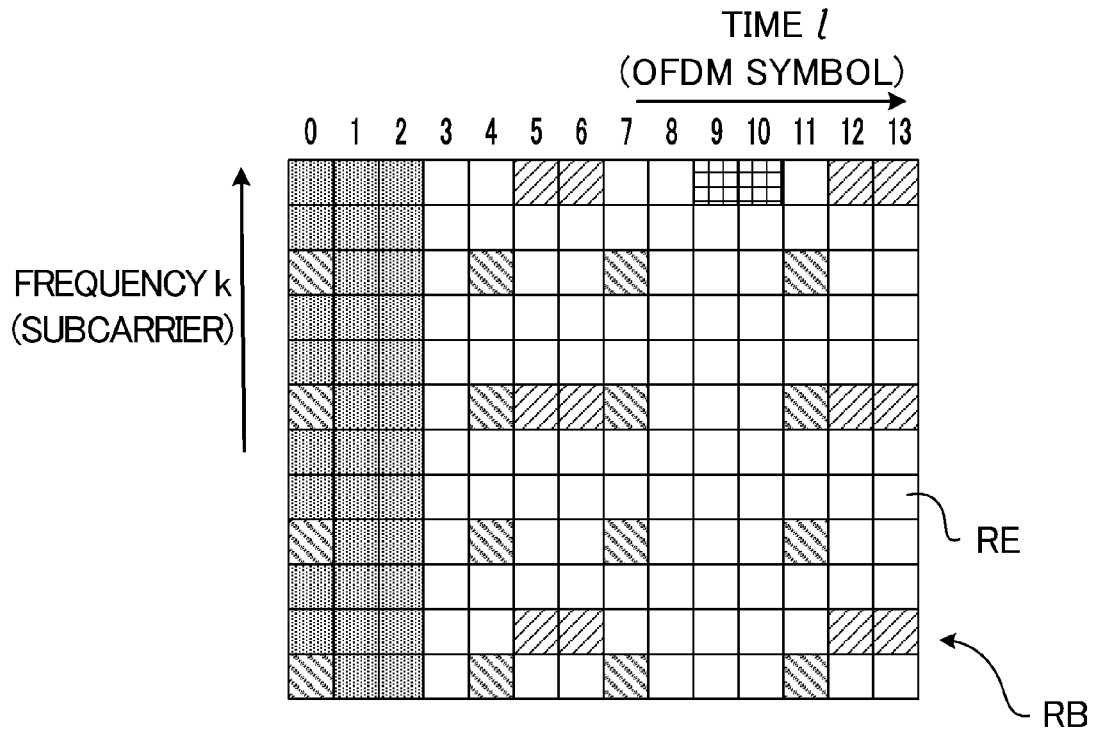
FIG. 5 is a diagram showing an example of LTE-Advanced-specified mapping of various signals in one resource block RB for downlink transmission.

The time-domain data composition unit 56 composites, to generate time-domain composite data, the digital time-domain control data and the digital time-domain user data. The digital time-domain control data has been modulated, has had the resource element information added thereto, and has been inverse-Fourier transformed in the master station apparatus 2. The digital time-domain user data has been modulated, has had the resource element information added thereto, and has been inverse-Fourier transformed in the slave station apparatus 4. The slave station apparatus 4 has to attain complete resource mapping of user data and control data for OFDMA-based downlink radio transmission. An example of such resource mapping is illustrated in FIGS. 4 and 5. The time-domain data composition unit 56 composites the time-domain control data and the time-domain user data in a manner that attains this resource mapping. The downlink scheduler 20 of the master station apparatus 2 performs resource mapping of user data and control data, similarly to an ordinary downlink scheduler of the radio base station 3.

Information on resource mapping is supplied to the slave station apparatus 4 using the auxiliary signal. The time-domain data composition unit 56 of the slave station apparatus 4 composites the time-domain control data and the time-domain user data in accordance with the information on resource mapping indicated in the auxiliary signal. By the master station apparatus 2 thus notifying the slave station apparatus 4 of the information on resource mapping (i.e., information for performing composition), the slave station apparatus 4 is able to composite the time-domain control data and the time-domain user data in a manner that attains resource mapping of user data and control data for OFDMA-based downlink radio transmission.

In a case in which the master station apparatus 2 supplies user data and control data to the slave station apparatus 4 in accordance with primary rules, the time-domain data composition unit 56 may composite the time-domain control data and the time-domain user data in accordance with primary rules corresponding to the rules used by the master station apparatus 2. In this case, the master station apparatus 2 does not need to indicate the information on resource mapping of the user data and the control data in the auxiliary signal.

The CP insertion unit 58 inserts CP in the time-domain composite data, which is output from the time-domain data composition unit 56. The radio transmission unit 60 is a circuit for performing radio transmission of downlink signals. Using the transmitting antenna 64, the radio transmission unit 60 transmits, by radio waves, the downlink time-domain composite data in which CP has been inserted.

The radio transmission unit 60 is to transmit a synchronization signal and a reference signal with power higher than that for user data. The master station apparatus 2 generates information for controlling the power of the synchronization signal and the transmission power of the reference signal, similarly to the ordinary downlink scheduler of the radio base station 3. The information for controlling the transmission power of the synchronization signal may be information indicating the amplitude of the synchronization signal. For example, the information for controlling the transmission power of the synchronization signal is represented as a ratio or difference relative to the amplitude of user data. The information for controlling the transmission power of the reference signal may be information indicating the amplitude of the reference signal. For example, the information for controlling the transmission power of the reference signal is represented as a ratio or difference relative to the amplitude of user data.

The information for controlling the transmission power of the synchronization signal and the transmission power of the reference signal is supplied to the slave station apparatus 4 using the auxiliary signal. The radio transmission unit 60 of the slave station apparatus 4 controls the power of the synchronization signal and the transmission power of the reference signal in accordance with the information indicated in the auxiliary signal for controlling the transmission power of the synchronization signal and the transmission power of the reference signal. By the master station apparatus 2 thus notifying the slave station apparatus 4 of the information for controlling the power of the synchronization signal and that of the reference signal, the slave station apparatus 4 is able to appropriately control the power of the synchronization signal and that of the reference signal.

As described above, in this embodiment, the master station apparatus 2 combines the digital time-domain control data, which has been modulated, has had the resource element information added thereto, and has been inverse-Fourier transformed, and the digital frequency-domain user data, which has not been modulated, has not had resource element information added thereto, and has not been inverse-Fourier transformed. The master station apparatus 2 then converts the combined data into an optical signal. Since the master station apparatus 2 does not modulate the digital user data or add resource element information to the digital user data, the amount of optical data originating from the user data does not increase. Furthermore, since the master station apparatus 2 converts, into the optical signal, the user data as frequency-domain user data without inverse-Fourier transforming the user data, the amount of optical data originating from the user data does not increase in this point either. The amount of data that is transmitted over the optical fiber 5 between the master station apparatus 2 and the slave station apparatus 4 can thus be considerably reduced, compared with a case in which the master station apparatus modulates and inverse-Fourier transforms the user data.

With regard to control data, the processing involved in resource element mapping is complex compared with that for user data. The processing in the slave station apparatus 4 thus increases if the slave station apparatus 4, which generally has limited processing capacity, performs modulation processing and resource element mapping of control data. Also, generation of control data is complex, and generating the control data in the slave station apparatus 4 greatly increases the processing load on the slave station apparatus 4. For example, generating a Zadoff-Chu sequence used in generating a synchronization signal is troublesome. In view of this, the processing load on the slave station apparatus 4 is reduced by the master station apparatus 2 performing the modulation processing and resource element mapping of control data. User data is subject to modulation processing, resource element mapping, and inverse Fourier transformation in the slave station apparatus 4 that executes OFDMA-based radio transmission. The load of these types of processing of user data is small. Accordingly, in the radio base station, the amount of data that is transmitted over the optical communication channels can be considerably reduced, while the increase in the processing load on the slave station apparatuses is minimized.

Second Embodiment

FIG. 5 shows an example of mapping various signals in one resource block RB of downlink transmission with LTE Advanced. The sign RB indicates one resource block and each square indicates a resource element RE that is composed of one subcarrier, which is the smallest resource unit, and one OFDM symbol.

As shown in FIG. 5, CSI-RS (channel state information RS) and DM-RS (demodulation RS) are transmitted in OFDM symbols in which user data (signals over the PDSCH) are transmitted (CSI-RS and DM-RS exist in the range of user data). CRS (cell-specific RS) are partly transmitted in the first OFDM symbol in which control data (PCFICH, PDCCH, PHICH) is transmitted (CRS exist in the range of control data), but are mostly transmitted in OFDM symbols in which user data is transmitted (CRS exist in the range of user data).

Reference signals to be transmitted at the same time as user data within each resource block (reference signals that are transmitted in OFDM symbols in which user data is transmitted) have to undergo downlink radio transmission from the radio base station, even when there is no downlink user data to be transmitted to the user equipment. In a radio base station having a master station apparatus 2 and a slave station apparatus 4, the slave station apparatus 4 has to perform downlink radio transmission of these reference signals, even when there is no downlink user data to be transmitted to the user equipment 6.

In the first embodiment, the modulation mapping unit 24 of the master station apparatus 2 modulates control data including all the reference signals. The master station apparatus 2 thus transmits, to the slave station apparatus 4 via the optical fiber 5, an optical signal originating from time-domain control data that includes components originating from all the reference signals. The slave station apparatus 4 performs downlink radio transmission of reference signals that are included in the time-domain control data from the master station apparatus 2.

In the first embodiment, even when there is no downlink user data to be transmitted to the user equipment 6, the master station apparatus 2 modulates all the reference signals and transmits an optical signal originating from time-domain control data that includes components originating from all the reference signals to the slave station apparatus 4 via the optical fiber 5 for radio transmission in the slave station apparatus 4. This results in an increase in the amount of optical data that is transmitted over the optical fiber 5.

A radio base station according to the second embodiment of the present invention, which will be described next, further reduces the amount of optical data that is transmitted over the optical fiber 5. The configuration of the master station apparatus 2 according to the second embodiment may be the same as that shown in FIG. 2. The master station apparatus 2 does not generate, among the reference signals, at least reference signals that are to be radio-transmitted at the same time as user data within each resource block. The modulation mapping unit 24 thus does not modulate these reference signals and excludes these reference signals from control data that serves as the basis of the modulated control data. The master station apparatus 2 therefore transmits, to the slave station apparatus 4 via the optical fiber 5, an optical signal originating from time-domain control data that does not include components originating from these reference signals.

Figure 6:
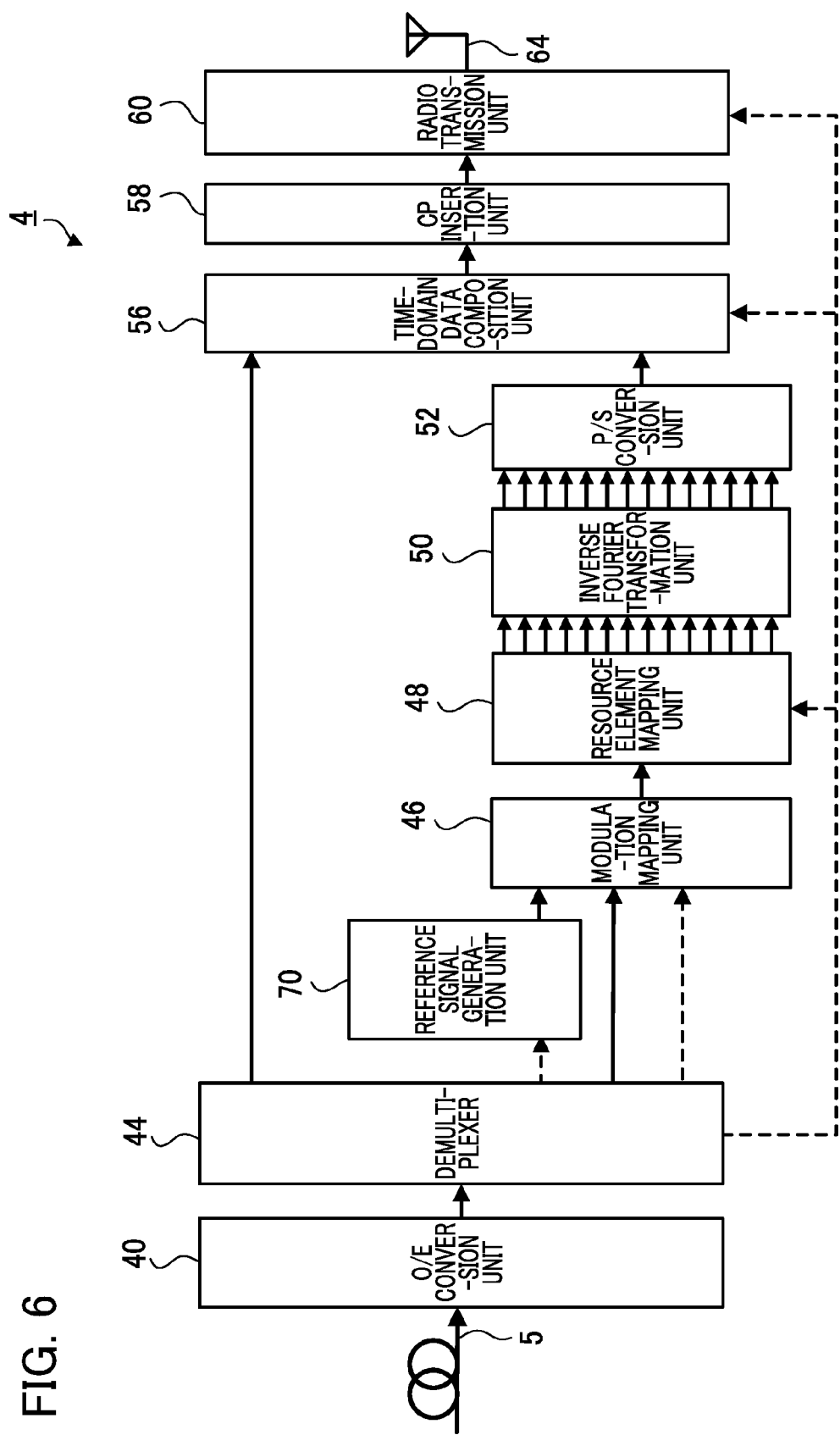
FIG. 6 is a block diagram showing the configuration of a slave station apparatus according to a second embodiment of the present invention.

FIG. 6 is a block diagram showing the configuration of the slave station apparatus 4 according to the second embodiment. In FIG. 6, elements that are in common with the first embodiment (FIG. 3) are indicated with the same reference signs, and these elements will not be described in detail.

The slave station apparatus 4 according to the second embodiment includes a reference signal generation unit 70 in addition to the elements described above in relation to the first embodiment. The reference signal generation unit 70 is a functional block that is accomplished by the CPU (not shown in the figure) of the slave station apparatus 4 executing a computer program and functioning in accordance with the computer program. The reference signal generation unit 70 generates at least reference signals that are to be transmitted at the same time as user data within each resource block. For example, the reference signal generation unit 70 generates CSI-RS and DM-RS, and generates, among CRS, a CRS that is to be transmitted at the same time as user data within each resource block.

The master station apparatus 2 desirably transmits, to the slave station apparatus 4, an auxiliary signal that indicates a physical cell ID corresponding to the slave station apparatus 4 such that the slave station apparatus 4 is able to generate these reference signals. This auxiliary signal is desirably combined with user data and time-domain control data by the multiplexer 32 and received by the slave station apparatus 4. The demultiplexer 44 separates the electrical signal converted from the optical signal into the digital time-domain control data, which has been modulated and inverse-Fourier transformed by the master station apparatus 2, the digital user data, which has not been modulated or inverse-Fourier transformed, and the auxiliary signal (shown with dotted lines). The auxiliary signal indicating the physical cell ID is supplied to the reference signal generation unit 70.

As described in section 6.10 of 3GPP TS 36.211 version 10.7.0, reference signals can be generated based on a physical cell ID. Accordingly, by the master station apparatus 2 notifying the slave station apparatus 4 of the physical cell ID corresponding to the slave station apparatus 4, the reference signal generation unit 70 of the slave station apparatus 4 is able to generate these reference signals. In particular, in a case in which the physical cell ID of the slave station apparatus 4 changes, the master station apparatus 2 desirably notifies the slave station apparatus 4 of the physical cell ID of the slave station apparatus 4.

In a case in which the slave station apparatus 4 already knows the physical cell ID of the slave station apparatus 4, that is, in a case in which the physical cell ID of the slave station apparatus 4 is stored in a memory (not shown in the figure) of the slave station apparatus 4, the master station apparatus 2 does not need to notify the slave station apparatus 4 of the physical cell ID of the slave station apparatus 4. In this case, the reference signal generation unit 70 may generate the reference signals based on the physical cell ID stored in the memory. For example, in a case in which the physical cell ID of the slave station apparatus 4 is the same as that of the master station apparatus 2 and does not change, the reference signal generation unit 70 may generate the reference signals based on the physical cell ID stored in the memory, and the master station apparatus 2 does not need to notify the slave station apparatus 4 of the physical cell ID of the slave station apparatus 4. Even when the physical cell ID of the slave station apparatus 4 differs from that of the master station apparatus 2, if the physical cell ID of the slave station apparatus 4 does not change, the reference signal generation unit 70 may generate the reference signals based on the physical cell ID stored in the memory, and the master station apparatus 2 does not need to notify the slave station apparatus 4 of the physical cell ID of the slave station apparatus 4.

The reference signals generated by the reference signal generation unit 70 are supplied to the modulation mapping unit 46. The modulation mapping unit 46 applies a modulation format according to the type of a reference signal to modulate the reference signals of the frequency domain, and generates modulated reference signals. The resource element mapping unit 48 determines a resource element in OFDMA for radio-transmitting the reference signals according to the type of the reference signal, and adds resource element information indicating the determined resource element to the modulated reference signals of the frequency domain (frequency-domain modulated reference signals).

Similarly to the first embodiment, the modulation mapping unit 46 modulates the user data of the frequency domain (frequency-domain user data) in accordance with a modulation format that is to be used to modulate the user data and is indicated in the auxiliary signal supplied from the master station apparatus 2. Also similarly to the first embodiment, the resource element mapping unit 48 adds the resource element information to the frequency-domain user data in accordance with the information that indicates the resource element to which the user data is to be allocated, the information being indicated in the auxiliary signal supplied from the master station apparatus 2.

The inverse Fourier transformation unit 50 inverse-Fourier transforms the frequency-domain modulated user data, to which the resource element information has been added, and the frequency-domain modulated reference signals, to which the resource element information has been added. The inverse Fourier transformation unit 50 thus generates time-domain user data that includes components corresponding to the user data and components corresponding to the reference signals. The operations of other elements in the slave station apparatus 4 are the same as those in the first embodiment.

This embodiment is able to achieve the effects that are achieved in the first embodiment. Furthermore, because the optical data that is transmitted over the optical fiber 5 does not include at least components originating from reference signals to be radio-transmitted at the same time as user data within each resource block, the amount of optical data that is transmitted over the optical fiber 5 can be further reduced.

As described above with reference to FIG. 5, a part of CRS is transmitted in the first OFDM symbol in which control data (PCFICH, PDCCH, PHICH) is transmitted in each resource block. Reference signals that are not radio-transmitted at the same time as user data in each resource block may, as part of the control data, undergo processing such as modulation in the master station apparatus 2 and be transmitted to the slave station apparatus 4 over the optical fiber 5. Alternatively, such reference signals may be generated by the slave station apparatus 4, similarly to the other reference signals.

Third Embodiment

Figure 7:
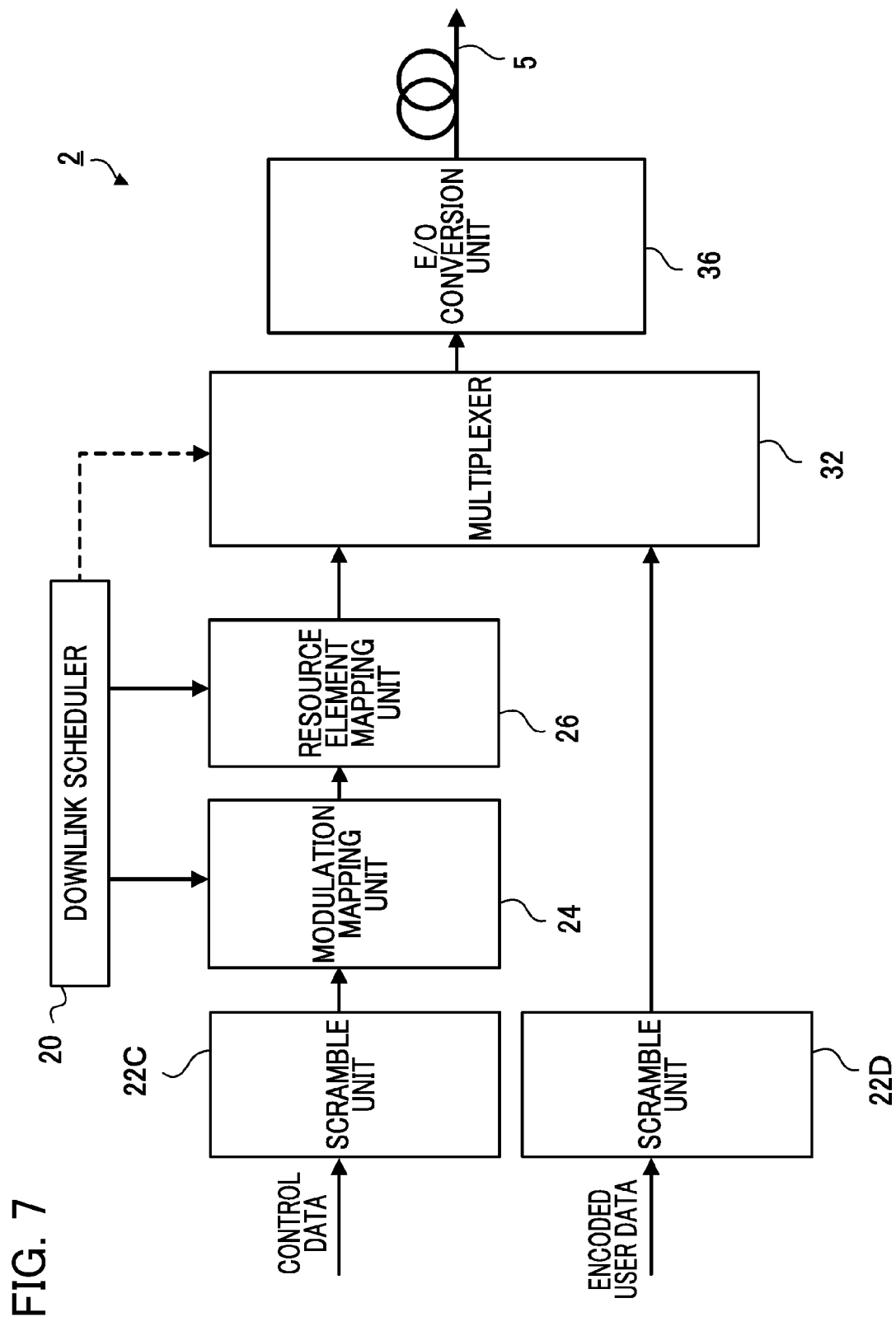
FIG. 7 is a block diagram showing the configuration of a master station apparatus according to a third embodiment of the present invention.

FIG. 7 is a block diagram showing the configuration of the master station apparatus 2 according to a third embodiment. In FIG. 7, parts relevant to downlink communication are shown, and illustration of other parts is omitted. In FIG. 7, elements that are in common with the first embodiment (FIG. 2) are indicated with the same reference signs, and these elements will not be described in detail.

Figure 8:
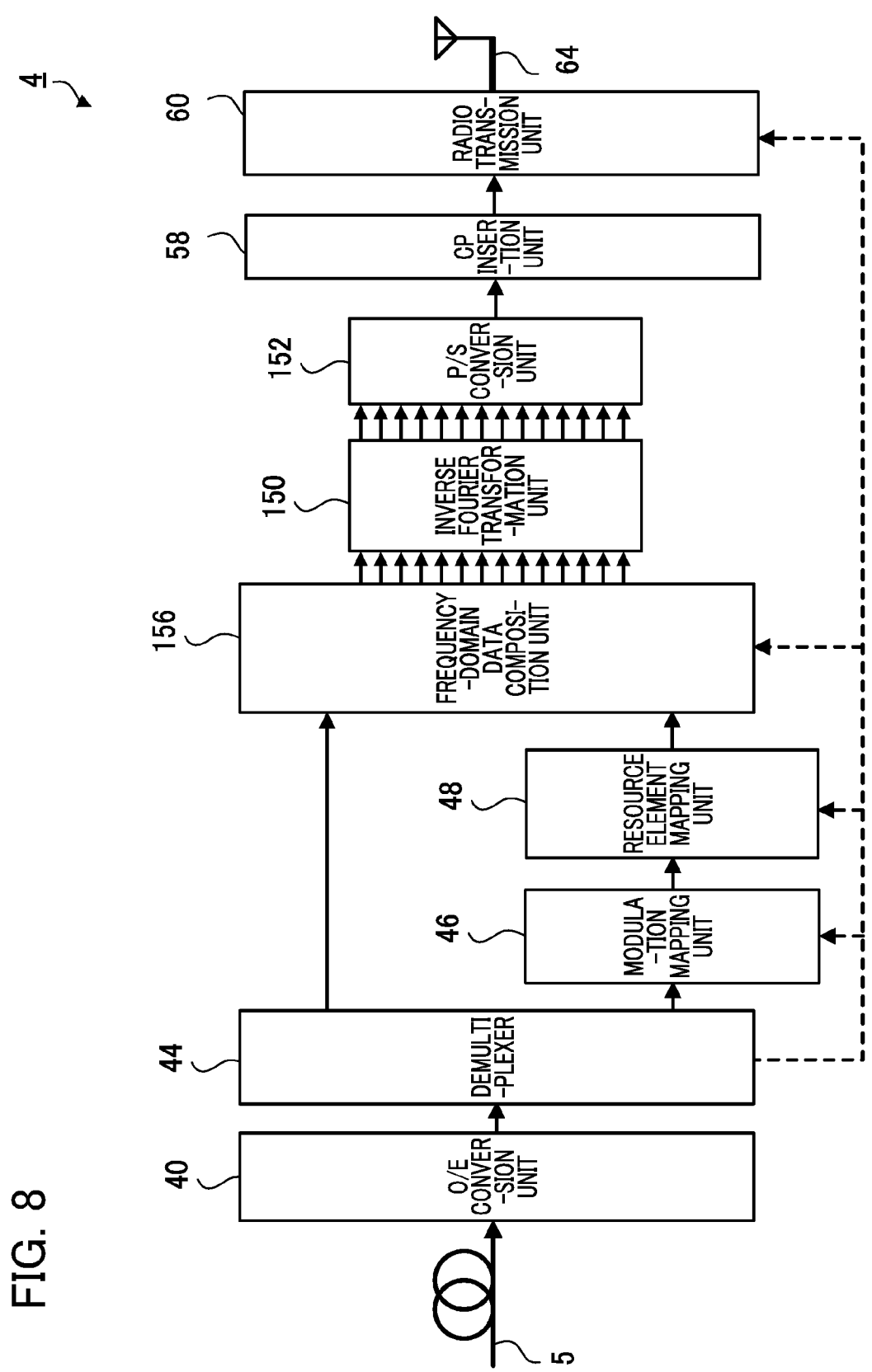
FIG. 8 is a block diagram showing the configuration of a slave station apparatus according to the third embodiment of the present invention.

FIG. 8 is a block diagram showing the configuration of the slave station apparatus 4 according to the third embodiment. In FIG. 8, parts relevant to downlink communication are shown, and illustration of other parts is omitted. For brevity, FIG. 8 shows a single slave station apparatus 4 alone. In FIG. 8, elements that are in common with the first embodiment (FIG. 3) are indicated with the same reference signs, and these elements will not be described in detail.

In the master station apparatus 2 according to the third embodiment shown in FIG. 7, modulated control data that is output from the resource element mapping unit 26 and to which the resource element information has been added is supplied directly to the multiplexer 32, without being inverse-Fourier transformed. The digital multiplexer (combining unit) 32 combines digital frequency-domain control data that is output from the resource element mapping unit 26, digital frequency-domain user data that is output from the scramble unit 22D, and an auxiliary signal. The digital frequency-domain control data has been modulated but has not been inverse-Fourier transformed. The digital frequency-domain user data has not been modulated or inverse-Fourier transformed.

The slave station apparatus 4 according to the third embodiment shown in FIG. 8 includes an inverse Fourier transformation unit 150, a P/S conversion unit 152, and a frequency-domain data composition unit 156, instead of the inverse Fourier transformation unit 50, the P/S conversion unit 52, and the time-domain data composition unit 56 (refer to FIG. 3).

The digital demultiplexer (separation unit) 44 separates the electrical signal converted from the optical signal into the digital frequency-domain control data, which has been modulated and has had the resource element information added thereto by the master station apparatus 2, the digital frequency-domain user data, which has not been modulated, has not had the resource element information added thereto, and has not been inverse-Fourier transformed, and the auxiliary signal (shown with dotted lines). Rules used by the demultiplexer 44 for separating the frequency-domain control data, the user data, and the auxiliary signal correspond to rules used by the multiplexer 32 of the master station apparatus 2 for combining them.

The digital frequency-domain control data, which has been modulated and to which the resource element information has been added, is supplied to the frequency-domain data composition unit 156. The digital frequency-domain user data, which has not been modulated and to which the resource element information has not been added, is supplied to the modulation mapping unit 46.

Similarly to the first embodiment, the modulation mapping unit (modulated user data generation unit) 46 for user data modulates the frequency-domain user data in accordance with a modulation format that is to be used to modulate the user data and is indicated in the auxiliary signal supplied from the master station apparatus 2. Also similarly to the first embodiment, the resource element mapping unit 48 adds the resource element information to the frequency-domain user data in accordance with the information that indicates the resource element to which the user data is to be allocated, the information being indicated in the auxiliary signal supplied from the master station apparatus 2.

The frequency-domain data composition unit 156 composites, to generate frequency-domain composite data, the digital frequency-domain control data, which has been modulated and to which resource element information has been added by the master station apparatus 2, and the digital frequency-domain user data, which has been modulated and to which resource element information has been added by the slave station apparatus 4. The frequency-domain composition unit 156 composites the frequency-domain control data and the frequency-domain user data in a manner that attains resource mapping of user data and control data for downlink radio transmission in OFDMA. An example of such resource mapping is illustrated in FIGS. 4 and 5. With a technique similar to the technique described above in relation to the first embodiment, the frequency-domain data composition unit 156 composites the frequency-domain control data and the frequency-domain user data in accordance with the information on resource mapping that is notified with the auxiliary signal from the master station apparatus 2 or in accordance with rules corresponding to the rules by which the master station apparatus 2 supplies user data and control data to the slave station apparatus 4.

The inverse Fourier transformation unit (time-domain composite data generation unit) 150 inverse-Fourier transforms the frequency-domain composite data to generate time-domain composite data. The inverse Fourier transformation unit 150 may be a functional block that is accomplished by the CPU (not shown in the figure) of the slave station apparatus 4 executing a computer program and functioning in accordance with the computer program, or may be an IC chip. The inverse Fourier transformation unit 150 may perform inverse discrete Fourier transformation, or may perform inverse fast Fourier transformation.

The P/S conversion unit 152 converts the time-domain composite data, which is output from the inverse Fourier transformation unit 150 and is parallel, into serial sequence. The CP insertion unit 58 inserts CP in the time-domain composite data that is output from the P/S conversion unit 152. The radio transmission unit 60 is a circuit for performing radio transmission of downlink signals. Using the transmitting antenna 64, the radio transmission unit 60 transmits, by radio waves, the downlink time-domain composite data in which CP has been inserted.

In this embodiment, the master station apparatus 2 combines the digital frequency-domain control data, which has been modulated and has had the resource element information added thereto, but has not been inverse-Fourier transformed, and the digital frequency-domain user data, which has not been modulated, has not had resource element information added thereto, and has not been inverse-Fourier transformed. The master station apparatus 2 then converts the combined data into an optical signal. Since the master station apparatus 2 does not modulate the digital user data or add the resource element information to the digital user data, the amount of optical data originating from the user data does not increase. Furthermore, since the master station apparatus 2 converts, into the optical signal, the user data as user data of the frequency domain (frequency-domain user data) without inverse-Fourier transforming the user data, the amount of optical data originating from the user data does not increase in this point either. The amount of data transmitted over the optical fiber 5 between the master station apparatus 2 and the slave station apparatus 4 can thus be considerably reduced, compared with a case in which the master station apparatus modulates and inverse-Fourier transforms the user data. Furthermore, in this embodiment, the master station apparatus 2 transmits an optical signal that includes components corresponding to digital frequency-domain control data that has not been inverse-Fourier transformed over the optical fiber 5. The amount of optical data that is transmitted over the optical fiber 5 can thus be further reduced, compared with the first embodiment in which the master station apparatus 2 transmits an optical signal that includes components corresponding to digital time-domain control data over the optical fiber 5. Additionally, in this embodiment, since the inverse Fourier transformation unit 28 and the P/S conversion unit 30 (refer to FIG. 2) of the master station apparatus 2 are not required, the number of elements in the overall radio base station can be reduced.

With regard to control data, the processing involved in resource element mapping is complex compared with that for user data. The processing in the slave station apparatus 4 thus increases if the slave station apparatus 4 performs modulation processing and resource element mapping of control data. Also, generation of control data is complex, and generating the control data in the slave station apparatus 4 greatly increases the processing load on the slave station apparatus 4. For example, generating a Zadoff-Chu sequence used in generating a synchronization signal is troublesome. In view of this, the processing load on the slave station apparatus 4 is reduced by the master station apparatus 2 performing the modulation processing and resource element mapping of control data. With regard to control data, however, the slave station apparatus performs inverse Fourier transformation together with the user data to generate data in time-domain format. The user data is subject to modulation processing, resource element mapping, and inverse Fourier transformation in the slave station apparatus 4 that performs OFDMA-based radio transmission. The load of these types of processing of user data is small. Accordingly, in the radio base station, the amount of data that is transmitted over the optical communication channels can be considerably reduced, while the increase in the processing load on the slave station apparatuses is minimized.

In this embodiment, all the reference signals may be handled as control data, similarly to the first embodiment. Alternatively, similarly to the second embodiment, at least the reference signals that are to be radio transmitted at the same time as user data within each resource block may be generated by the slave station apparatus 4.

Fourth Embodiment

Figure 9:
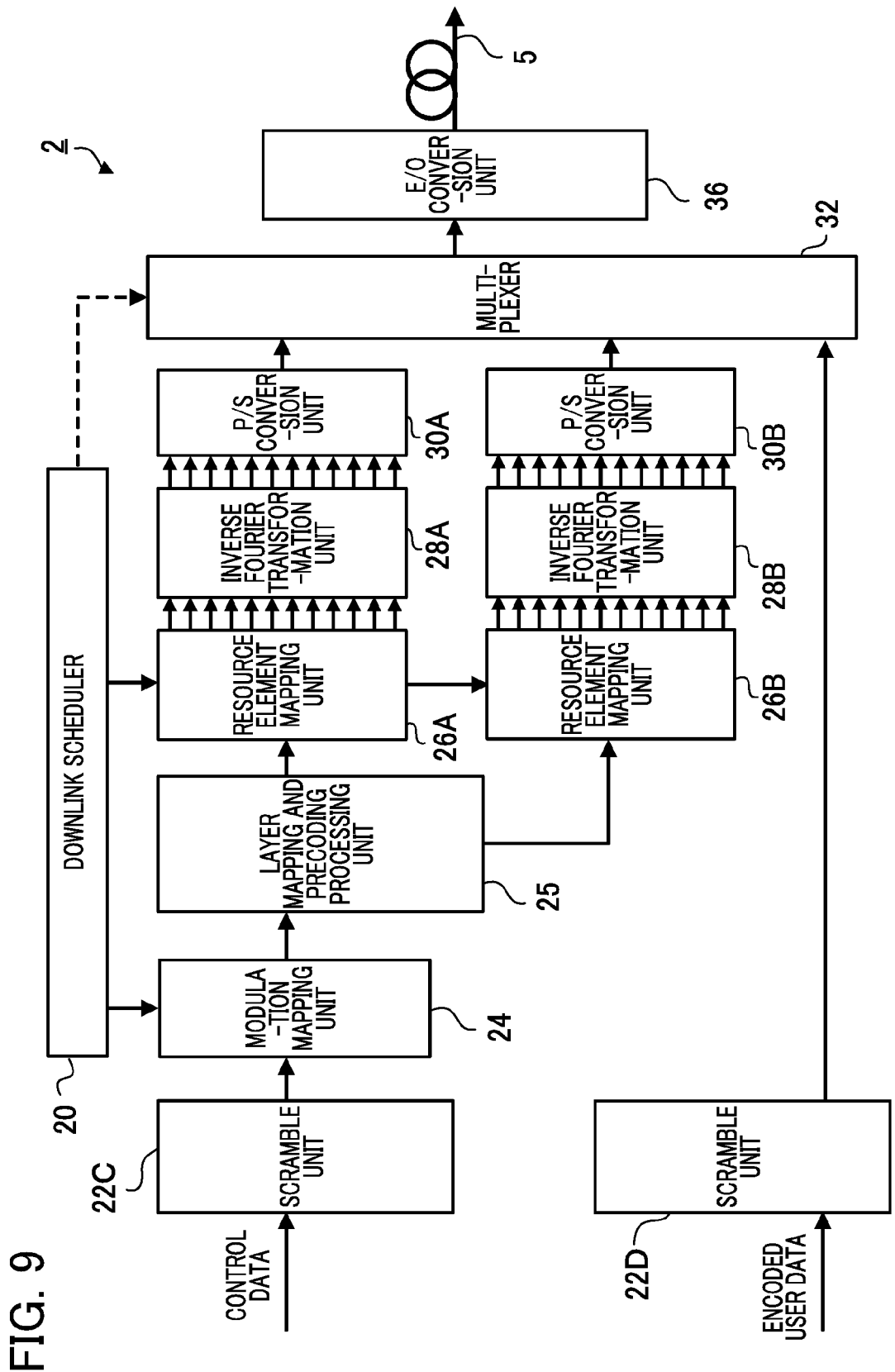
FIG. 9 is a block diagram showing the configuration of a master station apparatus according to a fourth embodiment of the present invention.

FIG. 9 is a block diagram showing the configuration of the master station apparatus 2 according to a fourth embodiment. In FIG. 9, parts relevant to downlink communication are shown, and illustration of other parts is omitted. In FIG. 9, elements that are in common with the first embodiment (FIG. 2) are indicated with the same reference signs, and these elements will not be described in detail.

Figure 10:
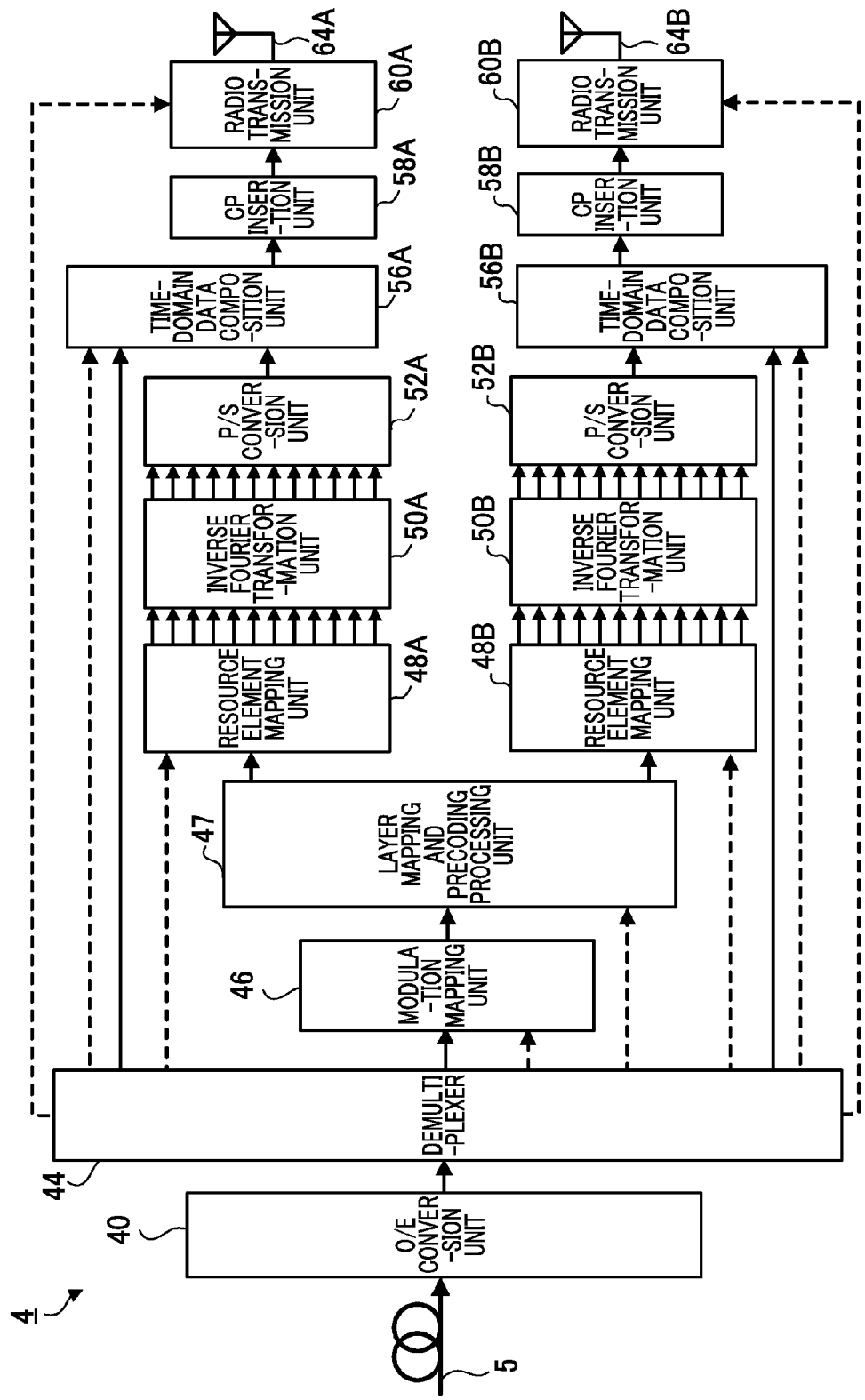
FIG. 10 is a block diagram showing the configuration of a slave station apparatus according to the fourth embodiment of the present invention.

FIG. 10 is a block diagram showing the configuration of the slave station apparatus 4 according to the fourth embodiment. In FIG. 10, parts relevant to downlink communication are shown, and illustration of other parts is omitted. For brevity, FIG. 10 shows a single slave station apparatus 4 alone. In FIG. 10, elements that are in common with the first embodiment (FIG. 3) are indicated with the same reference signs, and these elements will not be described in detail.

The fourth embodiment relates to MIMO (multiple-input and multiple-output). The slave station apparatus 4 according to the fourth embodiment shown in FIG. 10 includes a plurality of transmitting antennas 64A and 64B.

The master station apparatus 2 according to the fourth embodiment shown in FIG. 9 includes a layer mapping and precoding processing unit 25. The layer mapping and the precoding processing unit 25 performs layer mapping and precoding on, among the control data, control data that requires layer mapping and precoding. The control data that requires layer mapping and precoding is a PBCH signal, a PCFICH signal, a PDCCH signal, and a PHICH signal. The DM-RS, among the reference signals, is also included in the control data that requires layer mapping and precoding. The layer mapping and the precoding processing unit 25 is a functional block that is accomplished by the CPU (not shown in the figure) of the master station apparatus 2 executing a computer program and functioning in accordance with the computer program.

The master station apparatus 2 has resource element mapping units 26A and 26B, inverse Fourier transformation units (time-domain control data generation units) 28A and 28B, and P/S conversion units 30A and 30B, which are elements of a plurality of branches corresponding to the plurality of transmitting antennas 64A and 64B of the slave station apparatus 4.

Control data that has undergone layer mapping and precoding is supplied to the resource element mapping unit 26A or 26B that corresponds to the transmitting antenna 64A or 64B of the slave station apparatus 4 that is to transmit control data. The control data that has undergone layer mapping and precoding (e.g., synchronization signal) may be supplied to either one or both of the resource element mapping units 26A and 26B.

The resource element mapping units 26A and 26B, the inverse Fourier transformation units 28A and 28B, and the P/S conversion units 30A and 30B are the same as the resource element mapping unit 26, the inverse Fourier transformation unit 28, and the P/S conversion unit 30 for control data in the first embodiment without the subscripts A and B. These elements process control data diverted to the plurality of branches.

Similarly to the first embodiment, the digital user data output from the scramble unit 22D is directly supplied to the multiplexer 32 without undergoing modulation, resource mapping or inverse Fourier transformation. The master station apparatus 2 does not perform layer mapping or precoding of user data either.

The digital multiplexer (combining unit) 32 combines the digital time-domain control data, which is of the plurality of branches and is output from the P/S conversion units 30A and 30B, the digital frequency-domain user data output from the scramble unit 22D, and an auxiliary signal. The digital time-domain control data has been modulated, has had the resource element information added thereto, and has been inverse-Fourier transformed. The digital frequency-domain user data has not been modulated, has not had the resource element information added thereto, has not undergone layer mapping or precoding, and has not been inverse-Fourier transformed.

As shown in FIG. 10, the slave station apparatus 4 includes a layer mapping and precoding processing unit 47 for user data. The slave station apparatus 4 also has resource element mapping units 48A and 48B, inverse Fourier transformation units (time-domain user data generation units) 50A and 50B, P/S conversion units 52A and 52B, time-domain data composition units 56A and 56B, the CP insertion units 58A and 58B, and radio transmission units 60A and 60B, which are elements of a plurality of branches corresponding to the plurality of transmitting antennas 64A and 64B.

The digital demultiplexer (separation unit) 44 separates the electrical signal converted from the optical signal into the digital time-domain control data of the plurality of branches, the digital frequency-domain user data, and the auxiliary signal (shown with dotted lines). The digital time-domain control data has been modulated, has had the resource element information added thereto, and has been inverse-Fourier transformed by the master station apparatus 2. The digital frequency-domain user data has not been modulated, has not had resource element information added thereto, and has not been inverse-Fourier transformed. Rules used by the demultiplexer 44 for separating the time-domain control data of the plurality of branches, the user data, and the auxiliary signal correspond to rules used by the multiplexer 32 of the master station apparatus 2 for combining them.

The digital time-domain control data of the plurality of branches, which has been modulated, has had the resource element information added thereto, and has been inverse-Fourier transformed, are supplied to the time-domain data composition units 56A and 56B. The digital frequency-domain user data, which has not been modulated, has not had resource element information added thereto, and has not been inverse-Fourier transformed, is supplied to the modulation mapping unit 46.

Similarly to the first embodiment, the modulation mapping unit (modulated user data generation unit) 46 for user data modulates the frequency-domain user data in accordance with a modulation format that is to be used to modulate the user data and is indicated in the auxiliary signal supplied from the master station apparatus 2.

The layer mapping and precoding processing unit 47 performs layer mapping and precoding of the frequency-domain user data. The layer mapping and precoding processing unit 47 is a functional block that is accomplished by the CPU (not shown in the figure) of the slave station apparatus 4 executing a computer program and functioning in accordance with the computer program.

The downlink scheduler 20 of the master station apparatus 2 generates information for layer mapping and precoding of user data using a well-known technique based on information fed back from each piece of user equipment 6, such that the information suits each piece of user equipment. The layer mapping and precoding processing unit 47 performs layer mapping and precoding of the user data based on the information for layer mapping and precoding of user data generated by the downlink scheduler 20 of the master station apparatus 2.

The auxiliary signal that is supplied from the master station apparatus 2 indicates the information for layer mapping and precoding of user data. By the master station apparatus 2 thus notifying the slave station apparatus 4 of the information for layer mapping and precoding of user data, the slave station apparatus 4 is able to perform layer mapping and precoding of the user data that is transmitted from the master station apparatus 2 without having undergone layer mapping and precoding in the master station apparatus 2.

The frequency-domain user data that has undergone layer mapping and precoding is supplied to the resource element mapping unit 48A or 48B that corresponds to the transmitting antenna 64A or 64B of the slave station apparatus 4 that is to transmit the user data.

The resource element mapping units 48A and 48B, the inverse Fourier transformation units 50A and 50B, the P/S conversion units 52A and 52B, the time-domain data composition units 56A and 56B, the CP insertion units 58A and 58B, and the radio transmission units 60A and 60B are the same as the resource element mapping unit 48, the inverse Fourier transformation unit 50, the P/S conversion unit 52, the time-domain data composition unit 56, the CP insertion unit 58, and the radio transmission unit 60 in the first embodiment without the subscripts A and B. These elements process data diverted to the plurality of branches.

Each of the resource element mapping units 48A and 48B adds resource element information to the user data of the corresponding branch supplied to the resource element mapping unit, in accordance with the information that represents a resource element to which the user data is to be allocated, the information being indicated in the auxiliary signal supplied from the master station apparatus 2.

In accordance with the information on resource mapping that is notified with the auxiliary signal from the master station apparatus 2 or in accordance with rules corresponding to the rules by which the master station apparatus 2 supplies user data and control data to the slave station apparatus 4, each of the time-domain data composition units 56A and 56B composites, to generate time-domain composite data, digital time-domain control data and digital time-domain user data that are supplied to the time-domain data composition unit. The digital time-domain control data supplied to the domain data composition unit has been modulated, has had the resource element information added thereto, and has been inverse-Fourier transformed in the master station apparatus 2. The digital time-domain user data supplied to the domain data composition unit has been modulated, has had the resource element information added thereto, and has been inverse-Fourier transformed in the slave station apparatus 4.

Each of the radio transmission units 60A and 60B is a circuit for performing radio transmission of downlink signals, and transmits, by radio waves, the downlink time-domain composite data in which CP has been inserted, using the corresponding transmitting antenna 64A or 64B. Each of the radio transmission units 60A and 60B controls the power of a synchronization signal and the power of a reference signal, in accordance with information for controlling the power of the synchronization signal and the power of the reference signal, the information being indicated in the auxiliary signal supplied from the master station apparatus 2.

This embodiment is able to achieve the effects that are achieved in the first embodiment. Furthermore, in this embodiment, MIMO transmission can be executed in the slave station apparatus 4.

In this embodiment, all the reference signals may be handled as control data, similarly to the first embodiment. Alternatively, similarly to the second embodiment, at least the reference signals that are to be radio transmitted at the same time as user data within each resource block may be generated by the slave station apparatus 4.

This embodiment is a modification of the first embodiment or the second embodiment. The third embodiment may be modified so as to be similar to this embodiment. Specifically, in the master station apparatus 2, the modulated control data that is output from the resource element mapping units 26A and 26B and has had the resource element information added thereto may be directly supplied to the multiplexer 32 without undergoing inverse-Fourier transformation, and an optical signal including components of the digital frequency-domain control data that has not been inverse-Fourier transformed may be transmitted over the optical fiber 5. The slave station apparatus 4, instead of inverse-Fourier transforming the user data separately, may composite, to generate frequency-domain composite data, the digital frequency-domain control data that has been modulated and to which the resource element information has been added in the master station apparatus 2 and the digital frequency-domain user data that has been modulated and to which resource element information has been added in the slave station apparatus 4. The slave station apparatus 4 may then inverse-Fourier transform the frequency-domain composite data to generate time-domain composite data, and may transmit, by radio waves, the time-domain composite data in which CP has been inserted.

Fifth Embodiment

Figure 11:
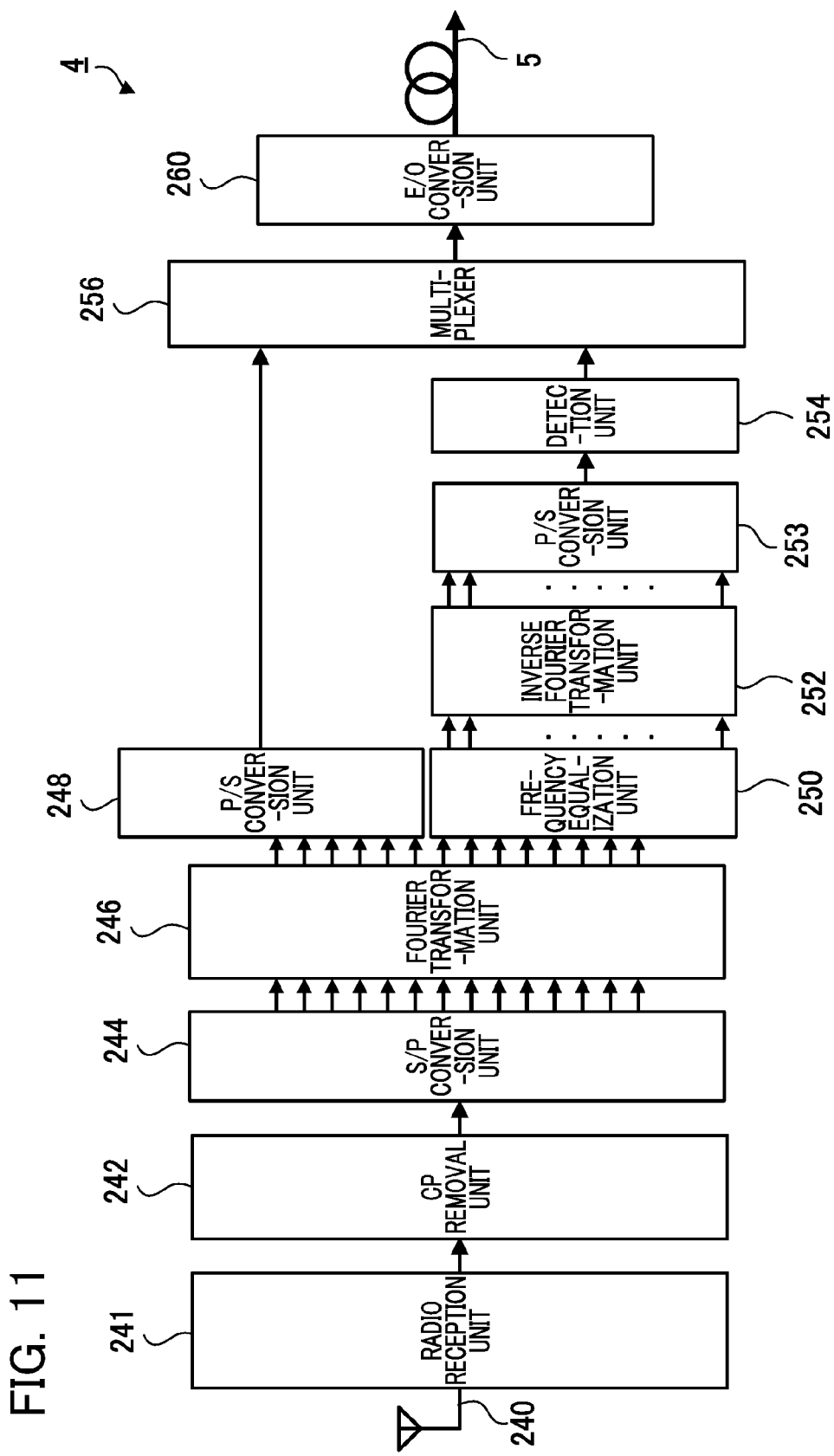
FIG. 11 is a block diagram showing the configuration of a slave station apparatus according to a fifth embodiment of the present invention.

FIG. 11 is a block diagram showing the configuration of the slave station apparatus 4 according to a fifth embodiment. In FIG. 11, parts relevant to uplink communication are shown, and illustration of other parts is omitted. For brevity, FIG. 11 shows a single slave station apparatus 4 alone.

As shown in FIG. 11, the slave station apparatus 4 is connected to the optical fiber (optical communication channel) 5. The slave station apparatus 4 is able to transmit an optical signal to the master station apparatus 2 over the optical fiber 5 in compliance with CPRI.

The slave station apparatus 4 includes a receiving antenna 240, a radio reception unit 241, a CP removal unit 242, an S/P conversion unit 244, a Fourier transformation unit 246, a P/S conversion unit 248, a frequency equalization unit 250, an inverse Fourier transformation unit 252, a P/S conversion unit 253, a detection unit 254, a multiplexer 256, and an E/O conversion unit 260.

The radio reception unit 241 is a circuit for performing radio reception of uplink signals from the user equipment 6. Using the receiving antenna 240, the radio reception unit 241 converts uplink radio waves into uplink electrical signals. The CP removal unit 242 removes CP from an electrical signal received from the user equipment 6. The S/P conversion unit 244 converts a time-domain electrical signal that is output from the CP removal unit 242 and is of serial sequence into parallel sequence.

Figure 13:
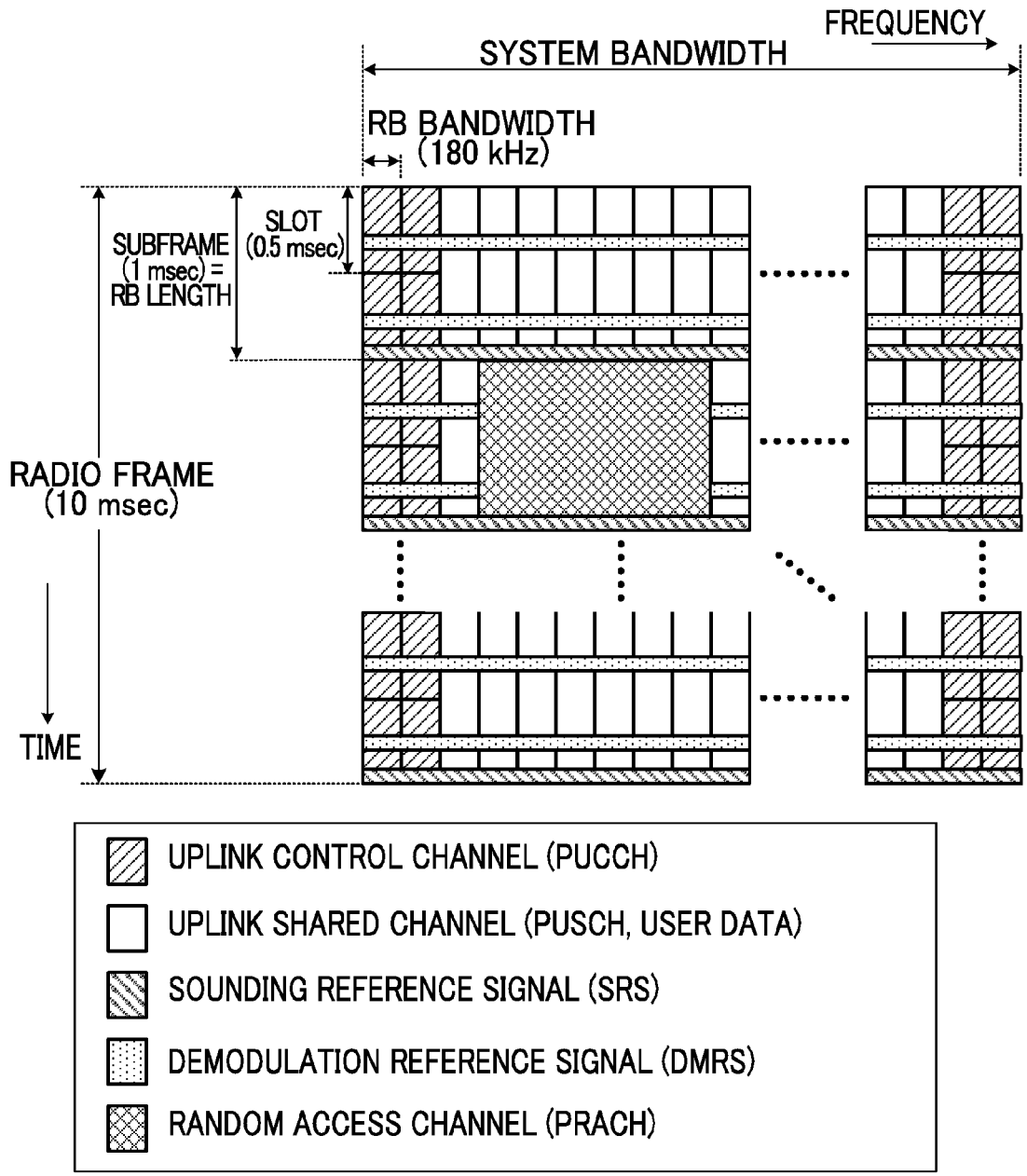
FIG. 13 is a diagram showing an LTE-specified format of an uplink physical channel in a radio section.

FIG. 13 shows the LTE-specified format of an uplink physical channel in a radio section. The uplink control channel (PUCCH) for the user equipment 6 to transmit control information is disposed in resource blocks at both ends of the system band, and the uplink shared channel (PUSCH) for the user equipment 6 to transmit user data is disposed in other resource blocks.

A demodulation reference signal (DM-RS) is used for demodulating user data transmitted from the user equipment 6 in the radio base station 1. The DM-RS is also used for uplink propagation path estimation and other purposes. The DM-RS is transmitted over the PUCCH and the PUSCH.

A sounding reference signal (SRS) is used to measure uplink channel quality in the radio base station. The SRS is transmitted over the PUCCH and the PUSCH. The SRS is disposed in the last symbol of each subframe.

A random access channel (PRACH) is used in order for the user equipment 6 to establish a connection with the radio base station 1 for performing initial access or handover. The PRACH is disposed in six resource blocks of a specific subframe that is determined by the radio base station 1.

The Fourier transformation unit 246 Fourier transforms the time-domain electrical signals that is of parallel sequence and is output from the S/P conversion unit 244 (uplink digital time-domain data) to generate frequency-domain data. The Fourier transformation unit 246 may be a functional block that is accomplished by the CPU (not shown in the figure) of the slave station apparatus 4 executing a computer program and functioning in accordance with the computer program, or may be an IC chip. The Fourier transformation unit 246 may perform discrete Fourier transformation, or may perform fast Fourier transformation.

The uplink frequency-domain data that is output from the Fourier transformation unit 246 is classified into frequency-domain user data that corresponds to uplink user data and frequency-domain control data that corresponds to uplink control data. In this specification, the uplink user data refers to user data signals that are transmitted over the PUSCH (Physical Uplink Shared Channel). Also, in this specification, the uplink control data refers to any physical layer uplink signals other than the uplink user data signals and the uplink DM-RS (demodulation RS). Specifically, the uplink control data refers to signals that are transmitted over the PUCCH (Physical Uplink Control Channel) and the PRACH (Physical Random Access Channel), and to the SRS (Sounding Reference Signal). The uplink control data thus includes at least a control signal (a PUCCH signal).

The frequency-domain user data that is output from the Fourier transformation unit 246 is supplied to the frequency equalization unit 250. The frequency equalization unit 250 performs frequency equalization of the frequency-domain user data output from the Fourier transformation unit 246, and suppresses the noise of signals influenced by frequency-selective fading in a radio section between the user equipment 6 and the slave station apparatus 4.

The inverse Fourier transformation unit (first inverse Fourier transformation unit) 252 inverse-Fourier transforms the frequency-domain user data output from the frequency equalization unit 250 to generate time-domain user data. The inverse Fourier transformation unit 252 may be a functional block that is accomplished by the CPU (not shown in the figure) of the slave station apparatus 4 executing a computer program and functioning in accordance with the computer program, or may be an IC chip. The inverse Fourier transformation unit 252 may perform inverse discrete Fourier transformation, or may perform inverse fast Fourier transformation. The P/S conversion unit 253 converts the time-domain user data that is output from the inverse Fourier transformation unit 252 and is of parallel sequence into serial sequence.

The detection unit (user data demodulation unit) 254 demodulates the time-domain user data to restore the uplink user data. The demodulation performed here corresponds to the modulation performed in the user equipment 6 using a modulation format such as QPSK or 16QAM, for example. The detection unit 254 is a functional block that is accomplished by the CPU (not shown in the figure) of the slave station apparatus 4 executing a computer program and functioning in accordance with the computer program.

In demodulating the uplink user data, the detection unit 254 uses the uplink DM-RS that is included in an uplink electrical signal. Because the uplink DM-RS is thus used in the slave station apparatus 4, the slave station apparatus 4 does not need to transmit the uplink DM-RS to the master station apparatus 2. In a case in which the master station apparatus 2 uses the uplink DM-RS for some reason, the slave station apparatus 4 may include the uplink DM-RS in the uplink control data that is transmitted to the master station apparatus 2. The user data restored by the detection unit 254 is supplied to the multiplexer 256.

Also, in demodulating the uplink user data, the detection unit 254 refers to uplink scheduling information generated by an uplink scheduler 220 of the master station apparatus 2 (described later). The detection unit 254 demodulates user data in accordance with the modulation format for each piece of user equipment 6 that is shown as a destination in the uplink scheduling information. The master station apparatus 2 notifies the slave station apparatus 4 of the uplink scheduling information with an auxiliary signal (not shown in the figure).

The frequency-domain control data output from the Fourier transformation unit 246 is supplied to the P/S conversion unit 248. The P/S conversion unit 248 converts the frequency-domain control data that is parallel into serial sequence for optical transmission to the master station apparatus 2. The serial sequence of the frequency-domain control data output from the P/S conversion unit 248 is supplied to the multiplexer 256.

The digital multiplexer (combining unit) 256 combines the user data restored by the detection unit 254 and the serial sequence of the frequency-domain control data output from the P/S conversion unit 248.

The E/O conversion unit (output conversion unit) 260 converts the data combined by the multiplexer 256 into an optical signal, and sends the optical signal to the optical fiber 5. The E/O conversion unit 260 thus functions as an output conversion unit that converts output data of the multiplexer 256 into an optical signal that can be transmitted over the optical fiber 5.

Figure 12:
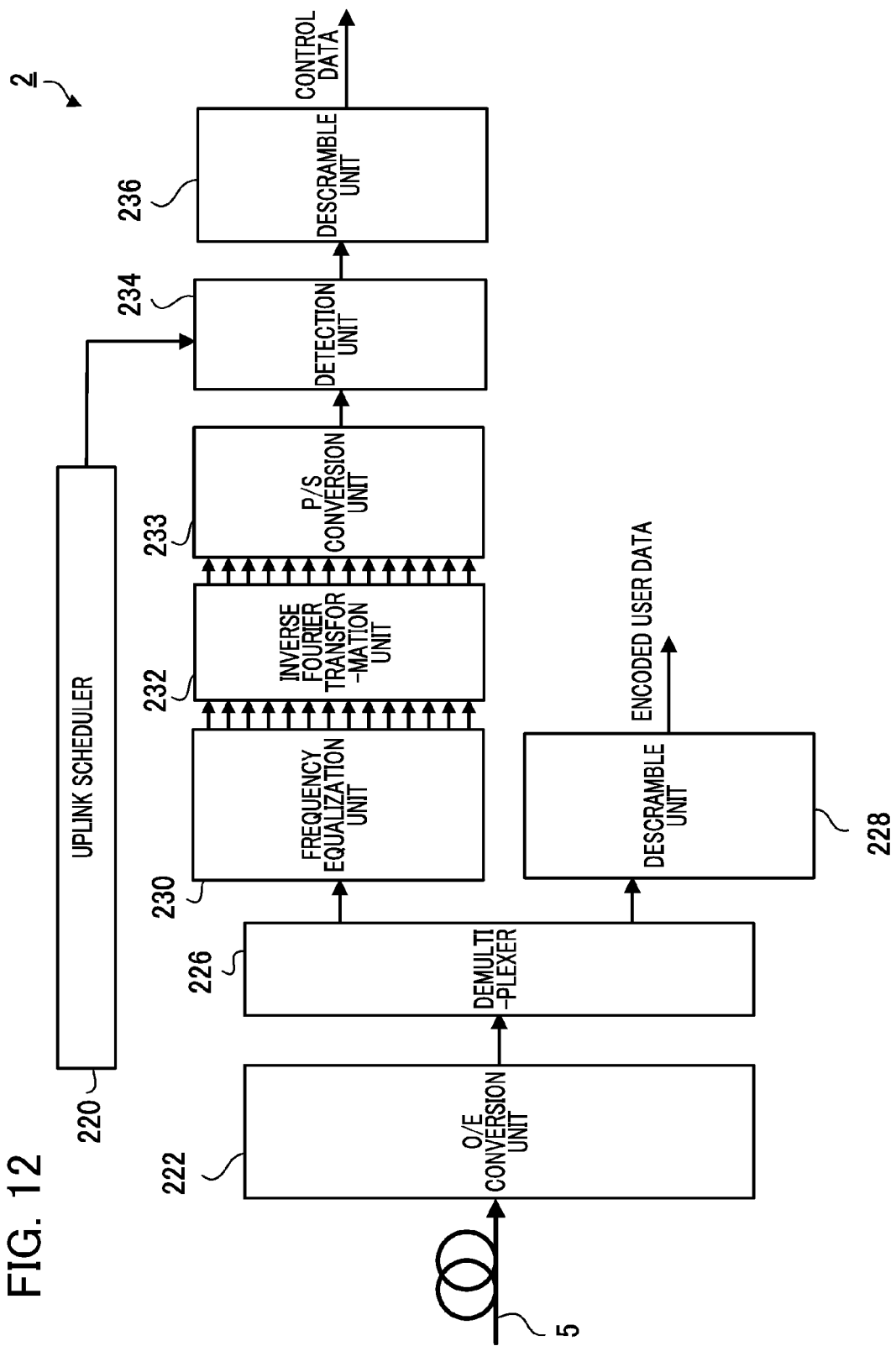
FIG. 12 is a block diagram showing the configuration of a master station apparatus according to the fifth embodiment of the present invention.

FIG. 12 is a block diagram showing the configuration of the master station apparatus 2 according to the fifth embodiment. In FIG. 12, parts relevant to uplink communication are shown, and illustration of other parts is omitted.

As shown in FIG. 12, the master station apparatus 2 is connected to the optical fiber 5. The master station apparatus 2 is able to receive an optical signal from the slave station apparatus 4 over the optical fiber 5 in compliance with CPRI.

The master station apparatus 2 includes an uplink scheduler 220, an O/E conversion unit 222, a demultiplexer 226, a descramble unit 228, a frequency equalization unit 230, an inverse Fourier transformation unit 232, a P/S conversion unit 233, a detection unit 234, and a descramble unit 236.

The uplink scheduler 220, the descramble unit 228, the detection unit 234, and the descramble unit 236 are functional blocks that are accomplished by the CPU (not shown in the figure) of the master station apparatus 2 executing a computer program and functioning in accordance with the computer program.

The O/E conversion unit 222 converts an optical signal received from the slave station apparatus 4 via the optical fiber 5 into an electrical signal.

The digital demultiplexer (separation unit) 226 separates the electrical signal converted from the optical signal into the user data that has been demodulated by the slave station apparatus 4 and the frequency-domain control data that has not been demodulated. Rules used by the demultiplexer 226 for separating the user data and the frequency-domain control data correspond to rules used by the multiplexer 256 of the slave station apparatus 4 for combining them.

The user data that has been demodulated by the slave station apparatus 4 and is output from the demultiplexer 226 is descrambled by the descramble unit 228, and the descramble unit 228 outputs encoded user data.

The frequency-domain control data that has not been demodulated and is output from the demultiplexer 226 is supplied to the frequency equalization unit 230. The frequency equalization unit 230 performs frequency equalization on the frequency-domain control data, and suppresses the noise of signals influenced by frequency-selective fading in the radio section between the user equipment 6 and the slave station apparatus 4.

The inverse Fourier transformation unit (second inverse Fourier transformation unit) 232 inverse-Fourier transforms the frequency-domain control data output from the frequency equalization unit 230 to generate time-domain control data. The inverse Fourier transformation unit 232 may be a functional block that is accomplished by the CPU (not shown in the figure) of the master station apparatus 2 executing a computer program and functioning in accordance with the computer program, or may be an IC chip. The inverse Fourier transformation unit 232 may perform inverse discrete Fourier transformation, or may perform inverse fast Fourier transformation. The P/S conversion unit 233 converts the time-domain control data that is output from the inverse Fourier transformation unit 232 and is of parallel sequence into serial sequence.

The detection unit (control data demodulation unit) 234 demodulates the time-domain control data to restore the uplink control data. The demodulation performed here corresponds to the modulation performed in the user equipment 6 using a modulation format such as BPSK or QPSK, for example. The detection unit 234 is a functional block that is accomplished by the CPU (not shown in the figure) of the master station apparatus 2 executing a computer program and functioning in accordance with the computer program. In demodulating the uplink control data, the detection unit 234 refers to the uplink scheduling information generated by the uplink scheduler 220. The detection unit 234 demodulates the control data in accordance with a modulation format according to the control data type or the like shown in the uplink scheduling information. The descramble unit 236 descrambles the demodulated control data and outputs encoded control data.

As described above, in this embodiment relating to uplink transmission, the slave station apparatus 4 inverse-Fourier transforms the frequency-domain user data to generate the time-domain user data, and demodulates the time-domain user data to restore the digital user data. The user data demodulated in this manner does not represent a constellation, and thus is short. The amount of data that is transmitted over the optical fiber 5 between the master station apparatus 2 and the slave station apparatus 4 can therefore be reduced, compared with a case in which the slave station apparatus does not demodulate the user data. With regard to control data, the processing load on the slave station apparatus 4 increases if the slave station apparatus 4 performs inverse Fourier transformation and demodulation. In view of this, the processing load on the slave station apparatus 4, which generally has limited processing capacity, is reduced by the master station apparatus 2 performing inverse Fourier transformation and demodulation of control data.

Other Modifications

In the first to fourth embodiments, the master station apparatus 2 mixes an auxiliary signal (side information) that indicates various types of information for radio transmission in the slave station apparatus 4 with other downlink data in the multiplexer, converts the mixed data into an optical signal, and transmits the optical signal to the slave station apparatus 4 via the optical fiber 5. The master station apparatus 2 may instead put the auxiliary signal on an optical signal that is of a sequence different from the optical signal originating from the other data, and transmit that optical signal to the slave station apparatus 4. Alternatively, the master station apparatus 2 may transmit the auxiliary signal to the slave station apparatus 4 by radio waves.

In the fifth embodiment, the master station apparatus 2 transmits an auxiliary signal that indicates the uplink scheduling information to the slave station apparatus 4. The auxiliary signal in this case may be mixed with downlink data in the multiplexer, put on an optical signal, and transmitted to the slave station apparatus 4. Alternatively, the master station apparatus 2 may put the auxiliary signal on an optical signal that is of a sequence different from the optical signal originating from the downlink data, and transmit that optical signal to the slave station apparatus 4. Alternatively, the master station apparatus 2 may transmit the auxiliary signal to the slave station apparatus 4 by radio waves.

In the above embodiments, the transmitting apparatus (master station apparatus in the first to fourth embodiments and slave station apparatus in the fifth embodiment) may have one or more bit width adjustment units, appropriately disposed in the transmitting apparatus, that adapt the number of bits of an electrical signal from the number of bits suitable for processing in the transmitting apparatus to that suitable for optical transmission. The receiving apparatus (slave station apparatus in the first to fourth embodiments and master station apparatus in the fifth embodiment) may have one or more bit width restoration units, appropriately disposed in the receiving apparatus, that adapt the number of bits of an electrical signal from the number of bits with which the electrical signal is received in optical transmission to the number of bits suitable for processing in the receiving apparatus.

In the master station apparatus 2 and the slave station apparatus 4, functions executed by the CPU may be executed by hardware instead of the CPU, or may be executed by a programmable logic device such as an FPGA (Field Programmable Gate Array) or a DSP (Digital Signal Processor).

DESCRIPTIONS OF REFERENCE SIGNS 1, 3 . . . radio base station; 2 . . . master station apparatus; 4 . . . slave station apparatus; 5 . . . optical fiber (optical communication channel); 6 . . . user equipment; 20 . . . downlink scheduler; 22C, 22D . . . scramble unit; 24 . . . modulation mapping unit (modulated control data generation unit); 25 . . . layer mapping and precoding processing unit; 26, 26A, 26B . . . resource element mapping unit; 28, 28A, 28B . . . inverse Fourier transformation unit (time-domain control data generation unit); 30, 30A, 30B . . . P/S (parallel-serial) conversion unit; 32 . . . multiplexer (combining unit); 36 . . . E/O (electrical-optical) conversion unit (output conversion unit); 40 . . . O/E (optical-electrical) conversion unit; 44 . . . demultiplexer (separation unit); 46 . . . modulation mapping unit (modulated user data generation unit); 47 . . . layer mapping and precoding processing unit; 48, 48A, 48B . . . resource element mapping unit; 50, 50A, 50B . . . inverse Fourier transformation unit (time-domain user data generation unit); 52, 52A, 52B . . . P/S (parallel-serial) conversion unit; 56, 56A, 56B . . . time-domain data composition unit; 58, 58A, 58B . . . cyclic prefix (CP) insertion unit; 60, 60A, 60B . . . radio transmission unit; 64, 64A, 64B . . . transmitting antenna; 70 . . . reference signal generation unit; 150 . . . inverse Fourier transformation unit (time-domain composite data generation unit); 152 . . . P/S (parallel-serial) conversion unit; 156 . . . frequency-domain data composition unit; 220 . . . uplink scheduler; 222 . . . O/E (optical-electrical) conversion unit; 226 . . . demultiplexer; 228 . . . descramble unit; 230 . . . frequency equalization unit; 232 . . . inverse Fourier transformation unit (second inverse Fourier transformation unit); 233 . . . P/S conversion unit; 234 . . . detection unit (control data demodulation unit); 236 . . . descramble unit; 240 . . . receiving antenna; 241 . . . radio reception unit; 242 . . . cyclic prefix (CP) removal unit; 244 . . . S/P conversion unit; 246 . . . Fourier transformation unit; 248 . . . P/S conversion unit; 250 . . . frequency equalization unit; 252 . . . inverse Fourier transformation unit (first inverse Fourier transformation unit); 253 . . . P/S conversion unit; 254 . . . detection unit (user data demodulation unit); 256 . . . multiplexer (combining unit); 260 . . . E/O (electrical-optical) conversion unit (output conversion unit).

The invention claimed is:

1. A radio base station comprising:
a master station apparatus;
a slave station apparatus that performs radio communication with user equipment; and
an optical communication channel that connects the slave station apparatus and the master station apparatus,
wherein the master station apparatus includes:
a modulated control data generation unit that modulates downlink digital control data that includes at least a synchronization signal and a control signal to generate modulated control data;
a resource element mapping unit that adds, to the modulated control data, resource element information indicating a resource element for radio-transmitting the control data in the slave station apparatus;
a combining unit that combines downlink digital frequency-domain user data that has not been modulated and data originating from the modulated control data to which the resource element information has been added; and
an output conversion unit that converts output data of the combining unit into an optical signal transmittable over the optical communication channel, and
wherein the slave station apparatus includes:
an optical-electrical conversion unit that converts the optical signal received via the optical communication channel into an electrical signal;
a separation unit that separates, from the electrical signal, the frequency-domain user data and the data originating from the modulated control data;
a modulated user data generation unit that modulates the frequency-domain user data to generate modulated user data;
a resource element mapping unit that adds, to the modulated user data, resource element information indicating a resource element for radio-transmitting the user data; and
a radio transmission unit that transmits, by radio waves, time-domain composite data including a component originating from the modulated user data to which the resource element information has been added and a component originating from the modulated control data to which the resource element information has been added.

2. The radio base station according to claim 1,
wherein the combining unit of the master station apparatus combines the modulated control data of a frequency domain, to which the resource element information has been added, and the downlink digital frequency-domain user data, which has not been modulated, and
wherein the slave station apparatus includes:
a frequency-domain data composition unit that composites, to generate frequency-domain composite data, the modulated user data of the frequency domain, to which the resource element information has been added, and the modulated control data of the frequency domain, to which the resource element information has been added by the master station apparatus; and
a time-domain composite data generation unit that inverse-Fourier transforms the frequency-domain composite data to generate time-domain composite data.

3. The radio base station according to claim 1, wherein the master station apparatus transmits, to the slave station apparatus, an auxiliary signal indicating information for the slave station apparatus to control a power of the synchronization signal and a power of a downlink reference signal.

4. The radio base station according to claim 1, wherein the master station apparatus transmits, to the slave station apparatus, an auxiliary signal indicating a modulation format to be used by the slave station apparatus to modulate the user data for each piece of user equipment to which the user data is directed.

5. The radio base station according to claim 1, wherein the master station apparatus transmits, to the slave station apparatus, an auxiliary signal indicating information for layer mapping and precoding of user data for the slave station apparatus to use in MIMO transmission.

6. The radio base station according to claim 1,
wherein the modulated control data generation unit of the master station apparatus does not modulate at least reference signals to be radio-transmitted at the same time as the user data within each resource block, and excludes the reference signals from control data that serves as a basis of the modulated control data,
wherein the output conversion unit of the master station apparatus generates the optical signal that does not include a component originating from the reference signals, and
wherein the slave station apparatus includes a reference signal generation unit that generates the reference signals.

7. The radio base station according to claim 6, wherein the master station apparatus notifies the slave station apparatus of a physical cell ID corresponding to the slave station apparatus such that the slave station apparatus is able to generate the reference signals.

8. A master station apparatus that connects, by an optical communication channel, to a slave station apparatus that performs radio communication with user equipment, comprising:
a modulated control data generation unit that modulates downlink digital control data that includes at least a synchronization signal and a control signal to generate modulated control data;
a resource element mapping unit that adds, to the modulated control data, resource element information indicating a resource element for radio-transmitting the control data in the slave station apparatus;
a combining unit that combines downlink digital frequency-domain user data that has not been modulated and data originating from the modulated control data to which the resource element information has been added; and
an output conversion unit that converts output data of the combining unit into an optical signal transmittable over the optical communication channel.

9. A slave station apparatus that connects, by an optical communication channel, to the master station apparatus according to claim 8 and that performs radio communication with user equipment, comprising:
an optical-electrical conversion unit that converts the optical signal received via the optical communication channel into an electrical signal;
a separation unit that separates, from the electrical signal, the frequency-domain user data and the data originating from the modulated control data;
a modulated user data generation unit that modulates the frequency-domain user data to generate modulated user data;
a resource element mapping unit that adds, to the modulated user data, resource element information indicating a resource element for radio-transmitting the user data; and
a radio transmission unit that transmits, by radio waves, time-domain composite data including a component originating from the modulated user data to which the resource element information has been added and a component originating from the modulated control data to which the resource element information has been added.

10. A radio base station comprising:
a slave station apparatus that performs radio communication with user equipment;
a master station apparatus; and
an optical communication channel that connects the slave station apparatus and the master station apparatus,
wherein the slave station apparatus includes:
a Fourier transformation unit that Fourier transforms uplink digital time-domain data originating from a signal received from the user equipment to generate frequency-domain data;
a first inverse Fourier transformation unit that inverse-Fourier transforms frequency-domain user data corresponding to user data, out of the frequency-domain data, to generate time-domain user data;
a user data demodulation unit that demodulates the time-domain user data to restore the user data;
a combining unit that combines the user data and frequency-domain control data corresponding to control data, out of the frequency-domain data, that includes at least a control signal; and
an output conversion unit that converts output data of the combining unit into an optical signal transmittable over the optical communication channel, and
wherein the master station apparatus includes:
an optical-electrical conversion unit that converts the optical signal received via the optical communication channel into an electrical signal;
a separation unit that separates the electrical signal into the user data and the frequency-domain control data;
a second inverse Fourier transformation unit that inverse-Fourier transforms the frequency-domain control data to generate time-domain control data; and
a control data demodulation unit that demodulates the time-domain control data to restore the control data.

* * * * *